US007406603B1

(12) United States Patent
MacKay et al.

(10) Patent No.: US 7,406,603 B1
(45) Date of Patent: Jul. 29, 2008

(54) DATA PROTECTION SYSTEMS AND METHODS

(75) Inventors: Michael K. MacKay, Los Altos, CA (US); W. Olin Sibert, Lexington, MA (US); Richard A. Landsman, Scotts Valley, CA (US); Eric J. Swenson, Santa Cruz, CA (US); William Hunt, Walnut Creek, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 872 days.

(21) Appl. No.: 09/653,517

(22) Filed: Aug. 31, 2000

Related U.S. Application Data

(60) Provisional application No. 60/151,790, filed on Aug. 31, 1999.

(51) Int. Cl.
| | |
|---|---|
| G06F 11/30 | (2006.01) |
| G06F 12/14 | (2006.01) |
| G06F 7/04 | (2006.01) |
| G06F 7/58 | (2006.01) |
| G06F 12/00 | (2006.01) |
| H04L 9/32 | (2006.01) |
| G06F 17/30 | (2006.01) |
| G06K 19/00 | (2006.01) |
| G11C 7/00 | (2006.01) |

(52) U.S. Cl. .................. 713/193; 713/189; 726/16; 726/17; 726/21; 726/26

(58) Field of Classification Search .............. 380/200, 380/216, 52; 713/200, 193, 189; 705/59, 705/51; 726/26, 16, 17, 21
See application file for complete search history.

(56) References Cited

U.S. PATENT DOCUMENTS 4,672,572 A   6/1987   Alsberg (Continued)

FOREIGN PATENT DOCUMENTS

AU     1-36815/97     2/1998

(Continued)

OTHER PUBLICATIONS

SDMI, "SDMI Portable Device Specification", Jul. 8, 1999, Part 1, Version 1.0.*

(Continued)

*Primary Examiner*—Ayaz Sheikh
*Assistant Examiner*—Shin-Hon Chen
(74) *Attorney, Agent, or Firm*—Finnegan, Henderson, Farabow, Garrett & Dunner LLP

(57) ABSTRACT

Systems and methods are provided for protecting electronic content from the time it is packaged through the time it is experienced by an end user. Protection against content misuse is accomplished using a combination of encryption, watermark screening, detection of invalid content processing software and hardware, and/or detection of invalid content flows. Encryption protects the secrecy of content while it is being transferred or stored. Watermark screening protects against the unauthorized use of content. Watermark screening is provided by invoking a filter module to examine content for the presence of a watermark before the content is delivered to output hardware or software. The filter module is operable to prevent delivery of the content to the output hardware or software if it detects a predefined protection mark. Invalid content processing software is detected by a monitoring mechanism that validates the software involved in processing protected electronic content. Invalid content flows can be detected by scanning the information passed across system interfaces for the attempted transfer of bit patterns that were released from an application and/or a piece of content management software.

20 Claims, 8 Drawing Sheets

U.S. PATENT DOCUMENTS

| | | | |
|---|---|---|---|
| 4,799,156 A | 1/1989 | Shavit et al. | |
| 4,823,264 A | 4/1989 | Deming | |
| 4,827,508 A | 5/1989 | Shear | |
| 4,930,073 A | 5/1990 | Cina, Jr. | |
| 5,103,476 A | 4/1992 | Waite et al. | |
| 5,111,390 A | 5/1992 | Ketcham | |
| 5,126,728 A * | 6/1992 | Hall | 713/201 |
| 5,224,163 A | 6/1993 | Gasser et al. | |
| 5,319,705 A | 6/1994 | Halter et al. | |
| 5,343,527 A | 8/1994 | Moore | |
| 5,390,330 A | 2/1995 | Talati | |
| 5,491,800 A | 2/1996 | Goldsmith et al. | |
| 5,530,235 A | 6/1996 | Stefik et al. | |
| 5,534,975 A | 7/1996 | Stefik et al. | |
| 5,613,089 A * | 3/1997 | Hornbuckle | 711/164 |
| 5,629,980 A | 5/1997 | Stefik et al. | |
| 5,634,012 A | 5/1997 | Stefik et al. | |
| 5,638,443 A | 6/1997 | Stefik et al. | |
| 5,640,546 A | 6/1997 | Gopinath et al. | |
| 5,692,047 A | 11/1997 | McManis | |
| 5,715,403 A | 2/1998 | Stefik | |
| 5,745,678 A * | 4/1998 | Herzberg et al. | 713/200 |
| 5,748,960 A | 5/1998 | Fischer | |
| 5,757,914 A | 5/1998 | McManis | |
| 5,797,127 A | 8/1998 | Walker et al. | |
| 5,835,896 A | 11/1998 | Fisher et al. | |
| 5,845,281 A * | 12/1998 | Benson et al. | 707/9 |
| 5,890,138 A | 3/1999 | Godin et al. | |
| 5,892,900 A | 4/1999 | Ginter et al. | |
| 5,897,620 A | 4/1999 | Walker et al. | |
| 5,905,975 A | 5/1999 | Ausubel | |
| 5,910,987 A | 6/1999 | Ginter et al. | |
| 5,915,019 A | 6/1999 | Ginter et al. | |
| 5,920,861 A | 7/1999 | Hall et al. | |
| 5,926,796 A | 7/1999 | Walker et al. | |
| 5,940,504 A | 8/1999 | Griswold | |
| 5,943,422 A | 8/1999 | Van Wie et al. | |
| 6,052,780 A | 4/2000 | Glover | |
| 6,064,739 A * | 5/2000 | Davis | 380/200 |
| 6,088,801 A * | 7/2000 | Grecsek | 713/200 |
| 6,112,181 A | 8/2000 | Shear et al. | |
| 6,157,721 A | 12/2000 | Shear et al. | |
| 6,185,683 B1 | 2/2001 | Ginter et al. | |
| 6,236,727 B1 * | 5/2001 | Ciacelli et al. | 380/212 |
| 6,327,652 B1 | 12/2001 | England et al. | |
| 6,330,670 B1 | 12/2001 | England et al. | |

FOREIGN PATENT DOCUMENTS

| | | | |
|---|---|---|---|
| AU | A-36816/97 | 2/1998 | |
| AU | A-36840/97 | 2/1998 | |
| EP | 0 128 672 A1 | 12/1984 | |
| EP | 0 399 822 A2 | 11/1990 | |
| EP | 0 421 409 A2 | 4/1991 | |
| EP | 0 565 314 B1 | 10/1993 | |
| EP | 0 715 247 A1 | 6/1996 | |
| EP | 0 913 757 A2 | 5/1999 | |
| EP | 915620 A1 * | 5/1999 | |
| GB | 2 264 796 A | 9/1993 | |
| WO | WO 90/02382 | 3/1990 | |
| WO | WO 92/22870 | 12/1992 | |
| WO | WO 93/01550 | 1/1993 | |
| WO | WO 94/03859 | 2/1994 | |
| WO | WO 94/06103 | 3/1994 | |
| WO | WO 96/27155 | 9/1996 | |
| WO | WO 97/43761 | 11/1997 | |
| WO | WO 98/09209 | 3/1998 | |
| WO | WO 98/10381 | 3/1998 | |
| WO | WO 98/37481 | 8/1998 | |
| WO | WO 98/45768 | 10/1998 | |
| WO | WO 99/01815 | 1/1999 | |
| WO | WO 99/24928 | 5/1999 | |
| WO | WO 99/48296 | 9/1999 | |
| WO | WO 00/75925 | 6/2000 | |
| WO | WO 01/10076 | 2/2001 | |

OTHER PUBLICATIONS

Internet Engineering Task Force (IETF) RFC 2693—SPKI Certificate Theory, Sep. 1999, available at http://www.ietf.org/rfc/rfc2693.txt?number=2693, 39 pages.

"Microsoft Authenticode Technology: Ensuring Accountability and Authenticity for Software Components on the Internet," Microsoft Corporation Shite Paper, Oct. 1996, 14 pages.

M. Blaze, et al., "Decentralized Trust Management," Proceedings IEEE Symposium on Security and Privacy, May 1996, pp. 164-173.

S. Berkovits, et al., "Authentication of Mobile Agents," *Mobile Agents and Security,* Giovanni Vigna, Ed., Springer-Verlag, 1998, pp. 114-136.

D. Chess, "Security Issues in Mobile Code Systems," *Mobile Agents and Security,* Giovanni Vigna, Ed., Springer-Verlag, 1998, pp. 1-14.

Li Gong, et al., "Signing, sealing and guarding java objects," *Lecture Notes in Computer Science,* vol. 1419, Mobile Agents, and Security, G. Vigna, Ed., Springer-Verlag, 1998, pp. 206-216.

F. Hohl, "Time Limited Blackbox Security: Protecting Mobile Agents from Malicious Hosts", *Lecture Notes in Computer Science,* vol. 1419, Mobile Agents and Security, G. Vigna, Ed., Springer-Verlag, 1998, pp. 90-111.

T. Sander, et al., "Protecting Mobile Agents Against Malicious Hosts," *Lecture Notes in Computer Science,* vol. 1419, Mobile Agents and Security, G. Vigna, Ed., Springer-Verlag, 1998, 16 pages.

T. Sander, et al., "Towards Mobile Cryptography," *International Computer Science Institute,* Berkeley, CA, TR-97-049, Nov. 22, 1997, pp. 1-14.

Hal Varian, "Buying, Sharing and Renting Information Goods", University of California at Berkeley, Dec. 1994, Current Version: May 14, 1999.

Hal Varian, "Economic Mechanism Design for Computerized Agents", School of Information Management and Systems, University of California at Berkeley, not dated.

Hal Varian, "Pricing Electronic Journals", D-Lib Magazine, Jun. 1996, ISSN 1082-9873.

Hal Varian, "Pricing Information Goods", University of Michigan, Jun. 1995.

Steve R. White et al., "ABYSS: A Trusted Architecture for Software Protection", 1987 IEEE, IBM Thomas J. Watson Research Center, Yorktown Heights, New York 10598, pp. 39-51.

Baker, A., *The Windows NT Device Driver Book,* Prentice Hall, NJ, 1997.

Borodin, A. et al., *Online Computation and Competitive Analysis,* Cambridge University Press, 1998.

Born, G., *Inside the Registry for Microsoft® Windows® 95,* Microsoft Press, Washington, 1997.

Brassil, J. et al., "Copyright Protection for the Electronic Distribution of Text Documents," *Proceedings of the IEEE,* vol. 87, No. 7, Jul. 1999, pp. 1181-1196.

Cox, I. et al., "Watermarking as Communictions with Side Information," *Proceedings of the IEEE,* vol. 87, No. 7, Jul. 1999, pp. 1127-1141.

Dekker, E. et al., *Developing Windows NT Device Drivers: A Programmer's Handbook,* Addison-Wesley Longman, Inc., Massachusetts, 1999.

Hartung, F. et al., "Multimedia Watermarking Techniques," *Proceedings of the IEEE,* vol. 87, No. 7, Jul. 1999, pp. 1079-1107.

Hennessy, J. et al., *Computer Architecture: A Quantitative Approach,* 2d ed., Morgan Kaufmann Publishers, Inc., California, 1996.

Hernandez, J. et al., "Statistical Analysis of Watermarking Schemes for Copyright Protection of Images," *Proceedings of the IEEE,* vol. 87, No. 7, Jul. 1999, pp. 1142-1166.

Kundur, D. et al., "Digital Watermarking for Telltale Tamper Proofing and Authentication," *Proceedings of the IEEE,* vol. 87, No. 7, Jul. 1999, pp. 1167-1180.

Menezes, A. et al., *Handbook of applied Cryptography,* CRC Press, 1996.

Patterson, D. et al., *Computer Organization and Design: The Hardware/Software Interface*, 2d ed., Morgan Kaufmann Publishers, Inc., California, 1998.

Petitcolas, F. et al., "Information Hiding—A Survey," *Proceedings of the IEEE,* vol. 87, No. 7, Jul. 1999, pp. 1062-1078.

Sairamesh, J. et al., "Economic Framework for Pricing and Charging in Digital Libraries," *D-Lib Magazine,* ISSN 1082-9873, Feb. 1996, 11 pgs.

Schneier, B., *Applied Cryptography*, 2d ed., John Wiley & Sons, 1996.

Solomon, D., *Inside Windows NT®*, 2d ed., Microsoft Press, Washington, 1998.

Voyatzis, G. et al., "The Use of Watermarks in the Protection of Digital-Multimedia Products," *Proceedings of the IEEE,* vol. 87, No. 7, Jul. 1999, pp. 1197-1207.

Wolfgang, R. et al., "Perceptual Watermarks for Digital Images and Video," *Proceedings of the IEEE,* vol. 87, No. 7, Jul. 1999, pp. 1108-1126.

"Frequently Asked Questions About Auction Types", available online at http://www.pages.ebay.com/help/basics/f-format.html, first viewed on Sep. 1, 1999, 3 pgs.

"Microsoft Site Server 3.0, Commerce Edition, Online Auctions," Microsoft Corporation, 1998, pp. 1-33.

"Microsoft Windows NT Device Driver Kit: Kernel-mode Driver Design Guide", Microsoft Corraboration, 1993, Table of Contents (5 introductory pages plus 8 pages); Chapter 1 (11 pages); Chapter 2 (54 pages); Chapter 3 (89 pages); Chapter 4 (21 pages); Chapter 8 (13 pages); Chapter 16 (57 pages); and Glossary (42 pages).

Sibert, O. et al., "Securing the Content, Not the Wire, for Information Commerce," InterTrust Technologies Corporation, 1996, 12 pages.

Diffie, Whitfield and Hellman, M. E., "New Directions in Cryptography," IEEE Transactions on Information Theory, vol. 22, No. 6, 1976, pp. 29-40.

Olin Sibert et al., "DigiBox: A Self-Protecting Container for Information Commerce," Proceedings of the First USENIX Workshop on Electronic Commerce, New York, NY, Jul. 1995, 9 pages.

Stefik, M., "Trusted Systems," Scientific American, Mar. 1997, pp. 78-81.

Stefik, M., "Letting Loose the Light: Igniting Commerce in Electronic Publication," Xerox PARC, Palo Alto, CA, 1994-1995, 35 pages.

Stefik, M., "Internet dreams: archetypes, myths, and metaphors," Massachusetts Institute of Technology, 1996, pp. 219-253.

Stefik, M., "Chapter 7, Classification, Introduction to Knowledge Systems," Morgan Kaufmann Publishers, Inc., 1995, pp. 543-607.

Schneier, *Applied Cryptography*, 2d ed., John Wiley & Sons Publishers, 1995, pp. 429-459.

\* cited by examiner

DATA PROTECTION SYSTEMS AND METHODS

RELATED APPLICATIONS

This application claims the benefit of U.S. Provisional Application No. 60/151,790, entitled "Data Protection Systems and Methods," filed Aug. 31, 1999, which is hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems and methods for processing electronic content. More specifically, the present invention relates to systems and methods for inspecting, classifying, controlling, and/or modifying the processing of protected electronic content to provide enhanced resistance to attempts to circumvent content protection.

BACKGROUND OF THE INVENTION

Conventional content protection mechanisms typically focus on protecting content while it is being transferred between systems and/or while it is stored on a system. For example, some conventional techniques provide mechanisms (with varying degrees of effectiveness) for securing the transmission and/or storage media itself, thus preventing, or at least resisting, malicious tampering or manipulation of the content. Other techniques concentrate on protecting the content directly—as opposed to the transmission and/or storage media—and make use of encryption and other technologies to make the content inaccessible, or at least practically unusable, while it is being transmitted or while it is stored.

A problem that arises, however, is that when content is released for use—for example, when stored audio content is decrypted and/or decompressed and played by a consumer—it is possible for an attacker to intercept the content and circumvent the content and/or transmission protection that was used. This is a serious problem, as most systems must remove the content protection at some point, since the content is typically of little use in its protected form.

One way to address this problem is to minimize the amount of time that the content is unprotected. For example, an audio file might be decrypted and/or decompressed by obscure drivers immediately before it is sent to the system's speakers or other output devices. This approach is not foolproof, however, as an attacker might simply record the audio output being played by the speakers, thus obtaining an unprotected (or less protected) copy of the content, albeit of somewhat lesser quality than the original. A more serious attack intercepts the content while it is still in digital form, before it is output to the user. For example, an attacker might insert or substitute a malicious software driver to intercept the content file as it is headed for an output device. The malicious driver might reroute and/or duplicate the unprotected content file, thus allowing the attacker to obtain a perfect digital copy of the content and/or to use the content in an unauthorized manner.

SUMMARY OF THE INVENTION

The present invention provides systems and methods for detecting and defending against attacks such as those described above. Specifically, systems and methods are disclosed for protecting content from the time it is packaged to the time it is released for use. It should be appreciated that the present invention can be implemented in numerous ways, including as a process, an apparatus, a system, a device, or a method. Several inventive embodiments of the present invention are described below.

In one embodiment, systems and methods are provided for performing programmatic inspection and generation of signatures or other identifiers for identifying software drivers, system software modules, and/or system hardware. Techniques are disclosed for deriving a signature or other identifier that allows identification of certain software modules based on behaviors such as their use of certain system programming interfaces, linkage with certain modules (program dependencies), recognizable internal data structures (implementation structure, constant data, etc.), opcode patterns (e.g., the structure of generated code and/or instruction sequences), and so forth. The signature or identifier encodes a persistent means for programmatically discriminating legitimate, known, and/or identifiable modules from impersonated, untrusted, and/or malicious modules. The technique may also be applied recursively to qualify program dependencies (e.g. the signature of dependent modules which are linked by the top-level system software module or software driver). Analysis may be used to qualify a configuration of multiple modules which form a qualified dependency graph.

In another embodiment, systems and methods for protecting content transfers are provided. Techniques are provided for locating a content signature or identifier in protected content, then filtering certain system programming interfaces (such as file writing interfaces) to prevent transfers of content, or to apply modifications to content, containing those signatures or identifiers. In a preferred embodiment, the content signature comprises a distillation (e.g., a secure hash or the like) of one or more parts of a protected content object, and is derived from the content itself. System interfaces that can be used to transfer or copy content to an inappropriate destination (e.g., files, network ports, etc.) are filtered by examining the data passing across those interfaces for the signatures or identifiers of protected content, and when a signature is found that indicates that content is being transferred inappropriately, the operation can be disallowed or the content can be modified in a predefined manner. The content signature mechanism is optimized for rapid scanning to locate signatures within large sequences of data. One or more signatures may be employed for a given protected content stream.

In another embodiment, systems and methods are provided for performing a discretionary, policy-based configuration and validation of systems software and drivers. Techniques are disclosed which allow an application to inspect systems software upon which its data processing is dependent, and which enable the application to determine based on a set of "rules" or policy controls whether it will allow, modify, or disallow downstream processing operations on protected content. This process can be advantageously implemented without dependency on, and regardless of any operating system support for, cryptographically signed code or access control mechanisms. For example, this process can be implemented under the control of the application itself, or under the control of trusted management or digital rights management (DRM) software with which the application is linked. The aforementioned policies and techniques can be flexible, and may vary between applications. For example, an application may specify that all downstream processing modules must be marked as "trusted" using a cryptographically-derived credential. Alternatively, or in addition, the application may specify that only modules that satisfy certain criteria regarding the correct use of certain system API functions are acceptable. In some embodiments, operations may be modified, rather than simply disallowed, in order to change the value of the content (data) that they process—for example by modifying the content to reduce or eliminate its commercial value (such as by inserting noise, or by damaging the format), to insert a special mark (such as a special watermark identifying the content as stolen), or other appropriate techniques.

In yet another embodiment of the present invention, a protection system is provided for controlling protected data/content processing and transfer based on inspection and/or qualification of dependent system software, drivers, and or hardware. System drivers, software, and/or hardware are inspected to determine whether electronic content can be processed by those drivers, software, and/or hardware. This process is controlled by the application management software which is linked with the application, or by a digital rights management (DRM) system linked with the application and responsible for protecting the content according to a set of rules or policies. The decision as to whether the system software, drivers, and/or hardware may process the content, or whether certain modifications should be applied to the content as it is processed, is based on a qualification or inspection technique implemented by a separate process that is operable to check the signature or cryptographically-derived identity of the system software, drivers, and/or hardware. In one embodiment, the determination of whether content may be processed or modified is independent of mechanisms or services such as file names of program files which implement system software or software driver code, and is also independent of cryptographically signed code and native operating system access control mechanisms or services provided by the operating system or system software itself.

In some embodiments, the determination of whether content may be processed is made using multiple qualification techniques to establish a confidence factor regarding the trustworthiness or security of the dependent system software, drivers, and/or hardware. Evaluation of the confidence factor is under control of the application or its associated management or DRM system. The application or its management software may specify a default interval for ongoing qualification of the dependent software in order to thwart tampering and/or replacement of the configured system software or drivers. Alternatively, the application or its related management software may register for asynchronous notification of changes detected by a separate, trusted qualification or inspection process running on its behalf, or by a notification facility in the operating system itself. In yet another embodiment, the application or its related management or DRM software may poll an interface implemented by the separate, trusted qualification or inspection process.

In one embodiment, techniques are provided for maintaining the non-circumventability of the qualification or inspection mechanism, and for providing the application or its related management software with the ability to detect the presence or removal of the inspection mechanism on a periodic basis, thereby creating an "interlock" mechanism that assures the presence or non-replacement of the correct version of the trusted qualification or inspection software. Thus, an effectively mandatory protection system can be provided which must be satisfied within the policy-based confidence factor in order for correct processing of the protected content to occur. In one embodiment, the policy and confidence factors may evaluate to simple boolean values.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
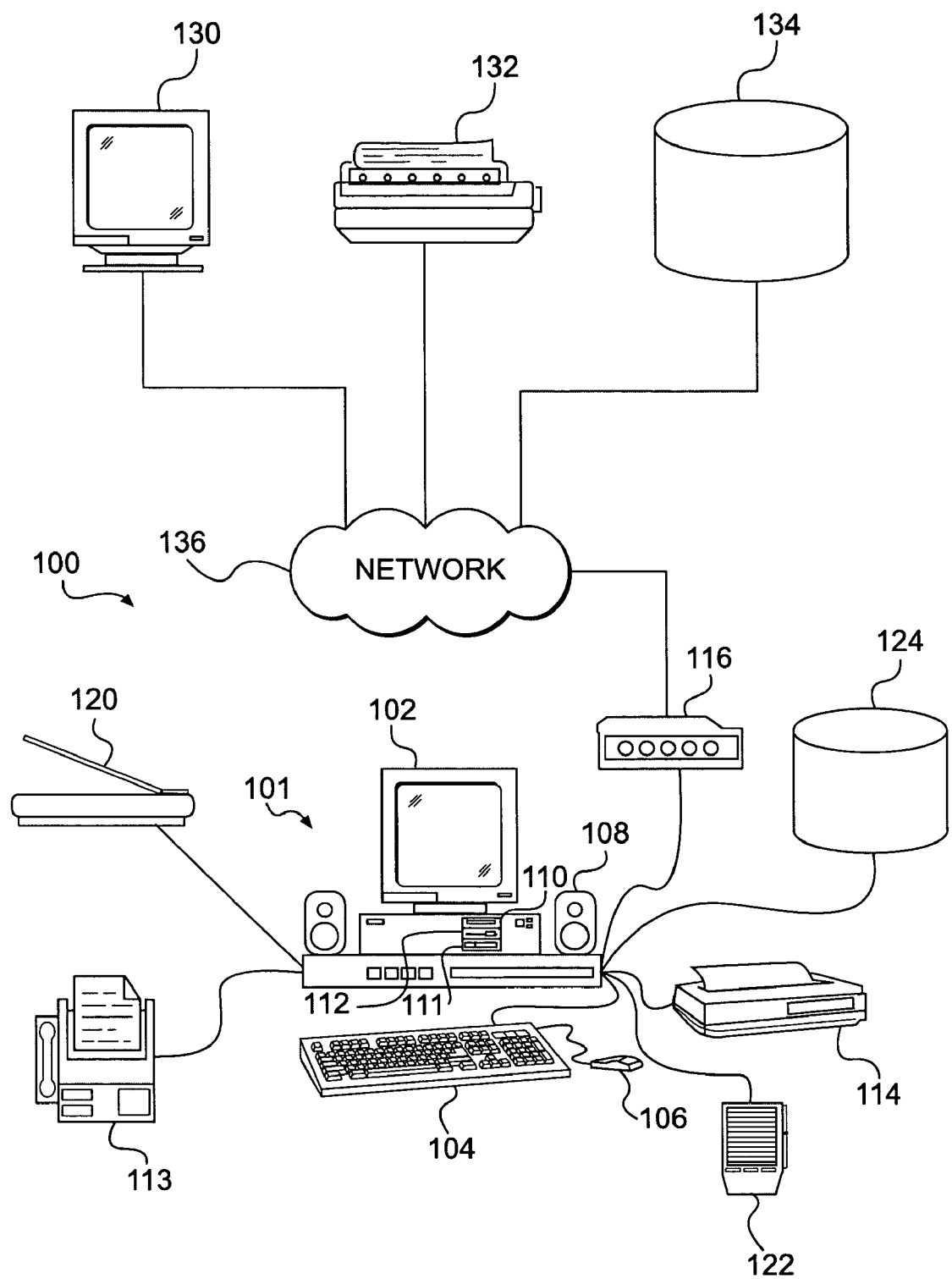
FIG. 1 illustrates a system for practicing an embodiment of the present invention.

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while several embodiments are described in the context of a system and method for protecting audio content, it should be appreciated that the disclosed systems and methods are readily adaptable for broader application. For example, without limitation, the present invention could be readily applied in the context of video, image, text, audio-visual, or other content types. In addition, while numerous specific details are set forth in the following description in order to provide a thorough understanding of the present invention, the present invention may be practiced according to the claims without some or all of these details. Similarly, for the purpose of clarity, certain technical material that is known in the art has not been described in detail in order to avoid obscuring the present invention. For example, in the following discussion reference is made to a number of terms, concepts, and techniques that are well-known in the fields of computer architecture, computer programming, and cryptography. Information on computer architecture and computer programming can be found, for example, in Hennessy et al., *Computer Architecture: A Quantitative Approach,* 2d ed. (Morgan Kaufmann 1996); Patterson et al.,

*Computer Organization and Design: The Hardware/Software Interface,* 2d ed. (Morgan Kaufmann 1997); *Microsoft Windows NT Device Driver Kit: Kernel-mode Driver Design Guide* (Microsoft 1993); Dekker et al., *Developing Windows NT Device Drivers: A Programmer's Handbook* (Addison-Wesley 1999); Born, *Inside the Registry for Microsoft Windows 95* (Microsoft Press 1997); Baker, *The Windows NT Device Driver Book* (Prentice Hall 1997); and Solomon, *Inside Windows NT,* 2d ed. (Microsoft Press 1998). Information on cryptography can be found, for example, in Menezes et al., *Handbook of Applied Cryptography* (CRC Press 1996) and Schneier, *Applied Cryptography,* 2d ed. (John Wiley & Sons 1995).

The following patents and applications, each of which is assigned to the assignee of the current application, are hereby incorporated in their entirety by reference: Ginter et al., "Systems and Methods for Secure Transaction Management and Electronic Rights Protection," U.S. Pat. No. 5,915,019, issued Jun. 22, 1999 ("the '019 patent"); Ginter et al., "Trusted Infrastructure Support Systems, Methods and Techniques for Secure Electronic Commerce, Electronic Transactions, Commerce Process Control Automation, Distributed Computing, and Rights Management," U.S. patent application Ser. No. 08/699,712, filed Aug. 12, 1996 ("the '712 application"); Van Wie et al., "Steganographic Techniques for Securely Delivering Electronic Digital Rights Management Information Over Insecure Communications Channels, U.S. Pat. No. 5,943,422, issued Aug. 24, 1999 ("the '422 patent"); Ginter et al., "Systems and Methods for Secure Transaction Management and Electronic Rights Protection," U.S. Pat. No. 5,892,900, issued Apr. 6, 1999 ("the '900 patent"); Shear et al., "Cryptographic Methods, Apparatus and Systems for Storage Media Electronic Rights Management in Closed and Connected Appliances," U.S. patent application Ser. No. 08/848,077, filed May 15, 1997 ("the Shear application"); Collberg et al., "Obfuscation Techniques for Enhancing Software Security," U.S. patent application Ser. No. 09/095,346, filed Jun. 9, 1998 ("the Collberg application"); Shear, "Database Usage Metering and Protection System and Method," U.S. Pat. No. 4,827,508, issued May 2, 1989 ("the Shear patent"); and Sibert, "Systems and Methods for Using Cryptography to Secure and Insecure Computing Environments," U.S. patent application Ser. No. 09/628,692, filed Jul. 28, 2000 ("the Sibert application").

The present invention relates generally to computer processing of protected digital content by applications and supporting operating system services implemented by kernel mode or user mode modules, also known as drivers or filters, respectively. The invention provides a set of services for inspecting, classifying, controlling, and modifying the functionality of the operating system modules according to the security policies of an application and/or a digital rights management (DRM) system linked with the application and responsible for ensuring the secure processing of digital content. The invention provides an extensible set of functions for protecting against the unauthorized use of digital content by enabling the application and/or its associated DRM system to restrict processing of, or to impose modifications to, the content depending on whether system modules are present which do not conform to the security policies of the application or DRM system. Such non-conformance can be determined by a variety of techniques, including without limitation, inspection, classification, and/or control of a module's dynamic behavior, static structure, and/or other identifying characteristics.

The present invention provides systems and methods for protecting digital content from the time it is packaged until it is experienced by the consumer. In one embodiment, a combination of watermarking and fingerprinting is used. The content producer pre-processes the content in order to obtain the information needed to enable transaction-time watermarking or fingerprinting at the consumer system (as described in more detail below). A watermarking technology is used to embed imperceptible codes into the content as it is being released to the consumer. The embedded information may identify not only the owner of the content, but also the individual who purchased or otherwise released the content. Thus, if the content is stolen and packaged in a file, or even re-recorded, it will retain a mark indicating who was responsible. Although watermarks are applied digitally, the advanced signal processing techniques on which they are based ensure that they can be recovered even after one or more analog processing steps are applied to the content. Multiple watermarking technologies may be used, thus giving content providers a variety options.

In another embodiment, protection against content misuse is provided by encryption, watermark screening, detection of invalid content processing software and hardware, and/or detection of invalid content flows. Encryption protects content that is delivered over the easily-intercepted RPC channel between the management software, application software, and the libraries that they use. Encryption provides secrecy, so that content cannot be intercepted and used, and also ensures that the RPC requests cannot be usefully modified in transit (modification might permit, for example, circumvention of an application's specified intentions). Watermark screening is provided by invoking a filter module to examine content before it is delivered to the output hardware. The filter module is operable to prevent delivery of the content if it detects a predefined protection mark. Invalid content processing software is detected by a monitoring mechanism. For example, when protected content is released by an application, a security monitoring module continuously validates that the software involved in processing the content (i.e., drivers, filters, etc.) will not misuse it. As described below, this validation can be performed by a combination of techniques that detect invalid software modules (such as AudioJacker) and/or ensure that known or validated software is present (such as legitimate drivers for audio cards). Invalid content flows can be detected by scanning information passed across file system interfaces (and/or other communication interfaces) for the attempted transfer of bit patterns that were released from the application and/or management software. For example, in one embodiment this technology looks for predefined "signatures" during file system operations.

FIG. 1 illustrates a system for practicing an embodiment of the present invention. As shown in FIG. 1, a typical computer system 100 includes a variety of interconnected components. For example, computer system 100 may include a personal computer 101, having a monitor 102, keyboard 104, mouse 106, speakers 108, hard disk drive 110, floppy disk drive 111, and CD-ROM drive 112. In addition, computer 101 may be capable of connecting to, or interacting with, printer 114, modem 116, facsimile machine 118, scanner 120, personal digital assistant (PDA) 122, external disk storage 124, and/or an ethernet (or other network) interface card (not shown). In addition, computer 101 may use modem 116 and/or a network interface card to interact with other computers 130, printers 132, storage media 134, and/or other peripheral devices connected to a network 136, such as a local area network (LAN) or the Internet. One of ordinary skill in the art will appreciate that the present invention can be practiced on systems that include only some of the components shown in FIG. 1, and can also be practiced on systems that use a variety of devices that are not shown in FIG. 1, including without limitation portable audio players, portable video players, digital cameras, video-cassette recorders (VCRs), and/or camcorders, to name just a few examples.

The operation of computer 101 is typically controlled by computer hardware operating under software control. In addition, the user of computer 101 can control its operation using, e.g., keyboard 104 and mouse 106, and can cause computer 101 to access digital content files stored on other devices in computer system 100. Once these files are accessed, the user can instruct computer 101 to process the files and/or send them to other devices in system 100. For example, a user might download an audio file from networked computer 130 and store the file on hard disk 110. Later, the user may access the file from hard disk 110 and cause it to be played on speakers 108, or downloaded to PDA 122, to name just a few illustrative examples of the operations a user might choose to perform.

Figure 2:
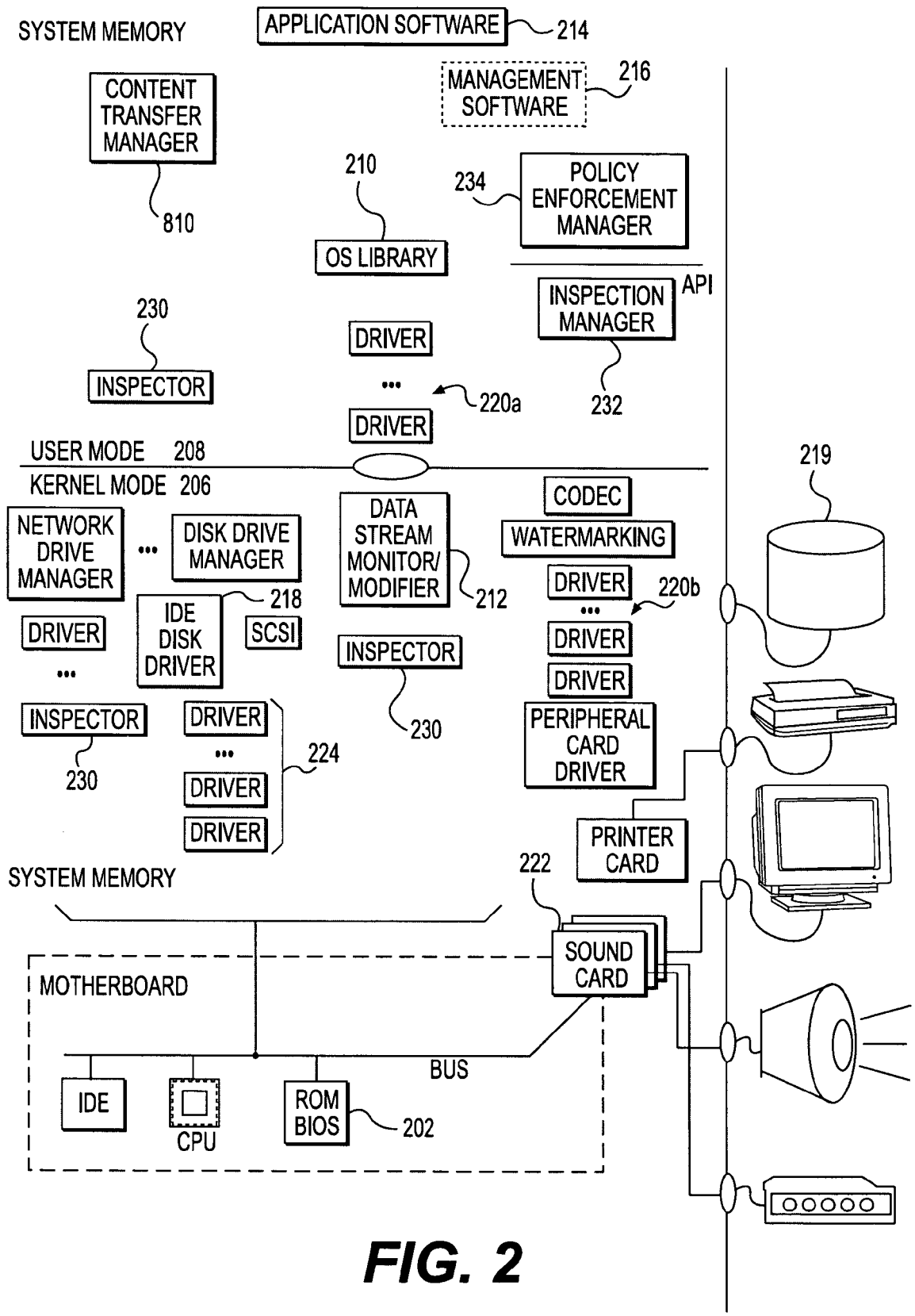
FIG. 2 is a more detailed illustration of a system for practicing the present invention.

As shown in FIG. 2, computer-implemented processing of digital data typically entails the collective operation of multiple software and hardware systems. The software systems involved in this processing typically include some or all of the following:
  Firmware 202, comprising basic input-output software or BIOS, often implemented in read-only, persistent memory such as ROM, PROM, EPROM, or flash memory;
  Operating system (OS) software, typically comprising a set of kernel mode modules and/or user mode modules;
  Libraries 210, typically comprising reusable modules, provided by the operating system developer or other parties, to implement common processing operations on files, databases, communications, and the like;
  Services, typically including programs that support processing for multiple applications, such as print spoolers, databases, web servers, middleware communications processes, and so forth; and
  Application programs 214 that implement processing for particular user activities such as editing a document, viewing a web page, playing a song or a movie, entering data into a form, or a virtually limitless set of other uses.

Not every computer system distinguishes between user mode 208 and kernel mode 206, although most systems do. If the distinction is important to the operating system, it is usually implemented with CPU support. For examples, the Intel 80×86 architecture provides hardware support for a distinction commonly referred to as the hardware ring protection architecture. The ring protection architecture enables kernel mode modules (sometimes referred to as supervisor mode modules) to operate in a hardware-protected ring (ring zero), and user mode modules to operate in a different ring (ring three). Ring three modules typically cannot directly call functions, or access program memory, associated with ring zero modules without using a hardware-supported ring transition gate feature. The transition gate feature is typically managed by a higher-level operating system abstraction, such as a system "trap" or "thunk" call, that packages program stack data on one side of the transition gate according to the rules of the operating system and hardware (implemented as a hardware interrupt or as a reserved instruction, depending on the CPU), and invokes execution on the other side of the transition boundary. Other processors provide techniques for accomplishing similar functions as do other operating systems such as Unix. For purposes of practicing the present invention, however, it is not directly material whether a given operating system and processor combination support a formal protection scheme that distinguishes between user mode and kernel mode processing. The present invention can be implemented regardless of this distinction, although the presence of the distinction is relevant to embodiments where kernel mode implementation techniques and user mode implementation techniques are coordinated across the transition boundary.

User and kernel mode operating system modules, libraries, services, and applications normally import and/or export some set of application programming interfaces (APIs), which are the interfaces that enable the computer software system to be constructed by many different people, in different places, and at different times. The term software "module" refers generally to a piece of software that has been packaged—usually using techniques specific to a given operating system and its supported program linkage and loader rules—as a set of binary instructions for a processor (or a machine that emulates a processor) to implement a computer program running either as part of the operating system or as software layered on top of the operating system. Standard module formats vary according to the operating system (and its linkage/loader rules), and packaged binary instructions also vary according to the supported processor. Standard formats include the ELF and .ELF64 formats for Unix systems, and the PE .DLL format for newer Microsoft operating systems. In addition to using (i.e., importing) or implementing (i.e., exporting) APIs, modules may also register for and process specific software or hardware interrupts.

Complex programs can be constructed from multiple modules, either statically at compile/link time when the programmer creates the program, or dynamically at runtime when the end user runs the program. Relevant characteristics of software modules include:
  the ability to determine imported APIs (e.g. the ability to inspect a subject module in order to identify its dependencies on other modules);
  the ability to determine exported APIs (e.g. the ability to determine if other modules can call or replace functions provided by a subject module);
  the ability to inspect static binary program structure;
  the ability to monitor dynamic binary program operation of a subject module through observation of API calls, software interrupts, hardware interrupts, and/or operating system messages and events implemented by that module in cooperation with other modules; and/or
  the ability of third-party code to introduce itself into the running binary program address space of a subject module and to replace functions implemented by that module.

The ability to determine imported APIs makes it possible for a developer equipped with the correct tools (such as common commercial development tools for the Windows operating system, including, for example, Microsoft's Visual Development products) to inspect a program and determine whether it uses certain operating system modules, libraries, etc. Examples of such programs include the Microsoft "Depends" program and DumpBin. This technique can be used to reverse engineer program structures for the purpose of debugging, replacing, and/or augmenting the function of in-place programs. Sound use of the technique enables developers to augment the functions provided to a program by creating "shim" or "wrapper" modules which extend the normal calls of dependent program modules. Using a technique commonly referred to as module interception, a skilled programmer can create a shim or wrapper module that masquerades as the original subject module and implements its APIs for the purpose of intercepting an API call ahead of the subject module. By using the API calls, parameters, and return values, the programmer can create a replacement for the original module and name it in such a way that the replacement code is called in place of the original code. The replacement code receives all calls for the original program, and can either handle them directly, or selectively pass them on to the original as its surrogate. Intercepting the calls allows the masquerading program to perform additional processing, which in some commercial examples allows for management, auditing or accounting functions, and/or connection with other networked systems.

Using a technique often referred to as module substitution, a skilled programmer can replace a known module with a substitute that implements the same API functions differently for purposes such as capturing protected data or information about the user. Module interception and replacement techniques can be used in conjunction with modules in either kernel mode or user mode processing. Current mass-market commercial operating system products provide no systematic support for preventing either module interception or module substitution in kernel mode or user mode code. Some networking and system management products support configuration control for workstation and server systems which may be useful for correcting the effects of module interception or module substitution relative to a baseline configuration established by a system administrator. Although such programs are useful in enterprise settings, they generally are not implemented in the consumer marketplace.

The ability to determine exported APIs makes it possible for a developer using common, commercially-supported tools, to inspect functions that the module implements for other programs, and to implement different versions of those interfaces. This technique is often referred to as API redirection. API redirection is widely used in commercial networking and management programs for product features that allow the end-user to configure file system networking and other useful administration features. API redirection can be used by any skilled third party, however, and can also be used to redirect functions for malicious purposes such as capturing private information about the user, protected data, and so on.

The ability to inspect the static structure of a program binary makes it possible for another program to potentially determine the logic of the subject program—program disassembler tools commonly provide this capability. More importantly, this technique makes it possible to identify patterns on a per module basis that uniquely identify the subject program and its dependent parts, thereby making it possible to distinguish the subject program from unauthorized substitutes.

The ability to create a program that can observe the API calls, software and hardware interrupt processing, messaging, and event behaviors of another subject program builds on the ability to determine imported and exported APIs, and the ability to distinguish interesting subject programs for discrete observation (such as a known module from a likely replacement module). Program debugging and performance tools often implement techniques for tracing an API call invoked on one module onto other dependent modules and potentially other API calls. In addition to instrumenting API calls, it may also be important for a monitor program to optionally track and instrument hardware and software interrupt (IRP) functions. Embodiments of the present invention apply the general API and IRP instrumentation techniques to programmatically discriminate calling paths of known good modules from those of potential replacement modules. Additionally, embodiments of the present invention are capable of detecting efforts to inspect and tamper with memory structures such as program buffers in RAM or on peripheral hardware, where protected digital content might be stored during processing (often referred to as memory snooping). When a replacement module is identified, the techniques of the present invention can be further employed to determine if the replacement module's observed dynamic behavior invokes APIs which would otherwise indicate behaviors inconsistent with the policy of the top-level controlling application (such as saving a file to storage or directing it to processing which is not part of the normal program behavior).

The ability to dynamically observe certain program behavior also makes it possible to identify whether an attempt is being made to introduce modifying code into the address space of another module. Techniques for implementing this type of behavior are sometimes referred to as code injection, and have been explained in press articles regarding the Windows operating system family (some operating systems make this type of behavior virtually impossible due to operating system-supported and hardware-enforced address space protection guarantees). Virus protection systems often incorporate a variety of techniques for detecting similar types of malicious attacks. These techniques generally rely on the ability to identify a specific program module along with its imported and exported APIs, and/or to trap and redirect interrupt processing provided by the host operating system. The ability to identify modules along with their imported and exported APIs, and also to be able to instrument these APIs for monitoring functions, provides a basis for being able to identify code which may attempt to modify the behavior of a known good module through address space code injection.

Referring once again to FIG. 2, when a computer processes digital data—for example a song in the form of a digital audio data-stream—a relatively large amount of the software in the computer system may be called into use. For example, application software 214 may appear to the user as a music player, providing an interface to select songs from a play list using controls represented as buttons. Another program may be called by player application 214, e.g., digital rights management (DRM) program 216, to check and enforce a set of policies or rules associated with the song—e.g., to determine whether that specific user is authorized at that time to play, or to perform some other action on, the song.

In addition, the operating system will typically be used to run both application 214 and DRM program 216, possibly as separate processes composed of multiple threads. The operating system may also enable application 214 and DRM program 216 to communicate via API calls with both user mode and kernel mode modules, and to perform operations on local disk storage subsystem 218 or across a network in order to, e.g., assemble play lists or the like. In addition, the operating system may be used to dynamically load additional program modules that may be needed to run parts of the application or other subsystems used by the application.

Driver software 220, which is commonly implemented as kernel mode modules, may also be called into service by the operating system. Driver software 220 commonly invokes additional BIOS-provided software to interact with certain hardware that forms part of the computer itself. For example, driver software 220 may be used by application 214 and DRM service 216 to communicate requests to open, read, write, and close files to the physical disk device 219, and, when playing a song, to communicate with sound card 222 and to process the audio data. Disk, keyboard, video, mouse, and audio devices, as well as external buses such as the Universal Serial Bus or a SCSI bus, are each controlled by one or more drivers which are typically organized into processing chains, such as processing chain 224. The operating system kernel provides support for connecting drivers 220b into chains, and for connecting the head-ends of these chains to code which implements the kernel/user-mode transition and the connection to user-mode filters 220a and libraries.

In an idealized scenario, the code that runs on the system is provided by reputable vendors and is well-designed, tested, functionally-consistent, and specific to the purpose of its part of the system. For example, an audio sound card vendor may supply an installation program and possibly multiple kernel-mode drivers and user-mode applications for configuring and using the sound card. Disk driver manufacturers and video card manufacturers generally do the same for their respective components.

However, the real world is not so ideal, and in fact the very complexity and modularity of the system makes it possible for a number of behaviors to exist that subvert or modify the intended design and operation of the system. For example, as described above, techniques that can be exploited for these purposes include API redirection; software and hardware interrupt processing redirection; module interception; module substitution; memory snooping in system RAM; memory snooping in other memory address spaces (e.g., system peripheral hardware); interception, redirection, and suppression of operating system messages and events; redirection of content to an unapproved I/O port or bus; injection of modifying program code into another program address space; and a variety of other techniques.

Embodiments of the present invention are operable to establish functions for monitoring system behavior and for detecting suspicious or directly malicious threats to the processing of digital content. These techniques are effective against the listed threats, and may also be useful against other threats still to be identified—which is an important characteristic, since it is advantageous for a system to be able to deal with new attacks as they arise.

Returning to the example of an audio player, several of the threats enumerated above have actually been used to attack digital audio content. For example, the A2B2WAV program was designed to inject code into a user-mode audio player, the code being operable to add a button to the audio player's graphical user interface which enabled users to save protected content in an unauthorized and unprotected form. The A2B2WAV program redirected protected content by inserting itself into the application calling chain, and by sending the resulting content to file storage. The present invention provides systems and methods for detecting this type of technique, as the behaviors required to instrument the user mode and kernel mode calling chains and to send the content to disk involve the use of API calls and interrupts that can be instrumented for detection of inappropriate behaviors when digital content is being processed.

Another example of an actual attack on digital audio content is the AudioJacker program. This program was designed to provide a substitute for a known commercial audio driver. While masquerading as the driver, the AudioJacker program converts protected content to an unprotected form and stores the result to disk. This type of attack is also detectable using embodiments of the present invention through the ability to distinguish the substitute driver from the known good driver, and/or by instrumenting other API and interrupt processing functions in order to detect behaviors which are not approved during processing of the protected digital content.

As described in more detail below, the present invention employs a combination of techniques, including transaction-time watermarking (or fingerprinting), transaction-time screening, driver software validation, and/or content transfer protection to deter and/or prevent attempts to circumvent the protection of electronic content. The goal of these mechanisms is to protect content as much as possible from the time it is packaged until it is experienced by the consumer.

1. Content Fingerprinting

As described below, in some embodiments a content watermarking or fingerprinting solution may be implemented in the system and/or client library. For convenience, "watermarking" will be used to refer to the mechanism that embeds information in content, whereas a "watermark" will refer to information that is embedded statically within the content to provide, for example, an indication of ownership and/or rules for content use. A "fingerprint" will generally refer to information that is embedded dynamically, as part of content release, and that (typically) identifies the user who performed the transaction, thus enabling content to be traced back to the user if, e.g., the content is subsequently used or distributed in an unauthorized manner. Note that a "watermarking" mechanism can be used to embed either a watermark or a fingerprint, depending on the nature of the information that is embedded.

In one embodiment, a credentialed watermarking engine is used to implement a predefined interface. Fingerprint attributes are associated with content to define the type of technology used to insert the fingerprint and the information to be included therein. An audio fingerprint can be applied at the time content is released, e.g., to a consumer using a music player application. Techniques for watermarking various types of signals (e.g., audio, visual, textual, etc.) are well-known in the art, and watermarking technology is readily-available from a variety of companies such as Fraunhofer IIS-A of Am Weischselgarten, 3 D-91058 Erlangen, Germany, and Verance Corporation of 6256 Greenwich Drive, Suite 500, San Diego, Calif. (formerly ARIS Technologies, Inc.). Additional watermarking techniques are described or referenced in Proceedings of the IEEE, *Identification & Protection of Multimedia Information*, pp. 1062-1207 (Jul. 1999), and in commonly-assigned U.S. patent application Ser. No. 09/588,652, entitled "Methods and Systems for Encoding and Protecting Data Using Digital Signature and Watermarking Techniques," filed Jun. 7, 2000, each of which is hereby incorporated by reference. It should be appreciated, however, that any suitable watermarking and/or fingerprinting technique may be used.

In a preferred embodiment, a hinted watermarking technique is used, such as that described in commonly-assigned U.S. patent application Ser. No. 09/629,546, entitled "Software Self-Defense Systems and Methods," filed Jul. 31, 2000, and in commonly-assigned U.S. patent application Ser. No. 09/629,807, entitled "Systems and Methods for Watermarking Software and Other Media," filed Jul. 31, 2000, the relevant sections of which are hereby incorporated by reference. Hinted watermarking techniques typically break the watermarking or fingerprinting process into at least two separate phases. During the first phase, the unwatermarked content is processed to identify and/or generate a variety of locations at which watermarks or fingerprints can subsequently be inserted. During the second phase, the watermarks or fingerprints are actually inserted at the specified locations. Thus, hinted watermarking allows the computationally intensive part of watermarking process to be performed in advance (e.g., at packaging time), thus facilitating the rapid insertion of watermarks or fingerprints while the content is being released.

Fingerprints can be applied to specific content types based on rules or requirements specified by content providers. In one embodiment the fingerprints include transaction information to identify the consumer, the content, and/or the transaction itself. Support can be provided for the use of multiple watermarking technologies, based on content provider requirements and/or platform/capabilities. In a preferred embodiment a hinted watermarking technique is used to improve the performance of fingerprint insertion.

It will be appreciated that fingerprint insertion can be performed in a variety of ways and at a variety of locations in the publishing lifecycle and/or the application's processing chain. For example, fingerprint insertion can be performed by the application and/or by specialized management software (if present). The application and/or management software may be operable to interact with a watermarking engine, delivering content to it for fingerprinting and getting fingerprinted content back. Essentially the same interface can be used at other points in the chain, either in the client library or in the application and/or management software.

1.1. Implementation

Figure 3:
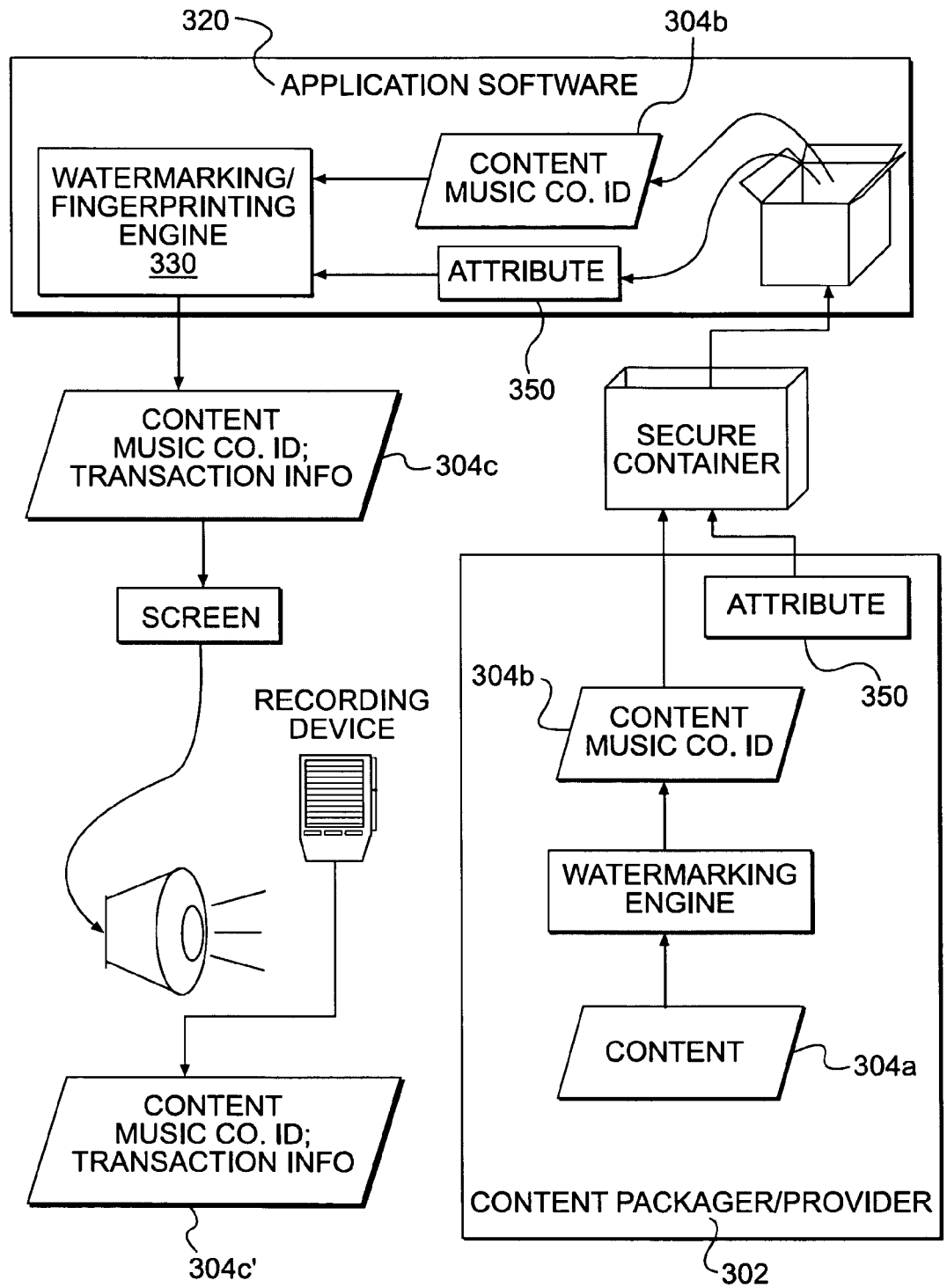
FIG. 3 is a block diagram of a system and method for fingerprinting content files.

FIG. 3 is a block diagram of a system and method for fingerprinting content files in accordance with an embodiment of the present invention. As shown in FIG. 3, content provider 302 can define an attribute 350 for content objects and/or content streams 304 to specify the type of fingerprinting that is to be used. For example, the fingerprint attribute can specify one or more fingerprint rules acceptable to the content provider. Each fingerprint rule may specify a watermarking technology and the parameters (which may be null) for use thereby. The parameters might be in a format dependent on the specific watermarking technology, and may be stored opaquely in the attribute. For example, a parseable ASCII format can be used. In one preferred embodiment, some or all of the following information may be specified:

Name (or other identifier) of the watermarking engine(s);

Specification of the information to be placed in the mark;

Parameters describing how the engine(s) should insert the mark; and

Specification of where to find the fingerprinting hints (if any).

A "null" fingerprinting rule can be placed at the end of the list to indicate that the content can be released without a fingerprint if none of the desired engines are available on the platform.

When access to a content object 304b is requested by the user, the application and/or the management software 320 looks for fingerprint attribute 350 and, if it is present, attempts to find an appropriate watermarking engine 330 to apply the fingerprint. For example, hooks can be provided in application or management software 320, and a search for watermarking engines 330 can be performed in the order specified in attribute 350. A watermarking engine name may specify the name of a loadable module (e.g., a DLL). The module can be loaded by application or management software 320, which obtains (and saves) pointers to the relevant interfaces. This can be implemented with the application or management software by defining standard interfaces for watermarking engines. For example, an initialization interface can be provided, a read interface for fetching marked (output) content, and/or a callback interface for fetching unmarked input content.

Application or management software 320 calls the watermarking engine's initialization interface with the initialization string specified in attribute 350 and the data to be represented by the fingerprint that the engine will embed. If the call fails, the next fingerprint rule in attribute 350 is attempted. Application or management software 320 sets up the callback interface for communicating with watermarking engine 330, and returns from the "content open" call. Subsequent "content read" calls to the application or management software are routed to the engine's read call.

1.2. Hinted Watermarking

In a preferred embodiment, a hinted watermarking technique is used, such as that described in commonly-assigned U.S. patent application Ser. No. 09/629,546, entitled "Software Self-Defense Systems and Methods," filed Jul. 31, 2000, and in commonly-assigned U.S. patent application Ser. No. 09/629,807, entitled "Systems and Methods for Watermarking Software and Other Media," filed Jul. 31, 2000, the relevant sections of which are hereby incorporated by reference. Hinted watermarking techniques typically break the watermarking or fingerprinting process into at least two separate phases. During the first phase, the unwatermarked content is processed to identify and/or generate a variety of locations at which watermarks or fingerprints can subsequently be inserted. During the second phase, the watermarks or fingerprints are actually inserted at the specified locations. Thus, hinted watermarking allows the computationally intensive part of watermarking process to be performed in advance (e.g., at packaging time), thus facilitating the rapid insertion of watermarks or fingerprints while the content is being released.

A design choice that arises when using a hinted watermarking technique is how to package the hints (i.e., the information indicating where and/or how the fingerprints should be inserted). One approach is to embed the hints in the content stream; another is to store the hints in a separate stream. Embedding the hints in the content stream will typically be simpler to implement (for both packaging and release), but may constrain the fingerprinting process to support only one watermarking engine per content object (except in the somewhat unlikely event that two different engines are able to interpret the same hints). In one embodiment, the content analysis and embedding of hints take place before the content is sent to the packaging application, thus obviating the need to make changes to the packager.

In a preferred embodiment, watermarking hints are stored in a separate stream (e.g., in attribute 350). This approach supports multiple watermarking engines for the same content and need not involve preprocessing of the content itself. It is also potentially more secure, since the hints can be stored separately (especially if the content can ever be released without passing through a watermarking engine). However, this approach is also generally more complex, and may require the packager to be able to obtain one or more sets of hints and to package them concurrently with the content (as separate streams). Moreover, on the reading side there will typically need to be multiple callback interfaces (or at least contexts) to allow the watermarking engine to fetch the hints. Synchronization will generally be necessary, albeit fairly straightforward to achieve, as the hint stream can be used to define the synchronization points.

1.3. Watermarking Engine Authentication

In one preferred embodiment credentials are used to authenticate the watermarking engine to the application and/or management software. For example, a valid watermarking engine DLL may be given a credential to cryptographically assure correct identification of the watermarking engine and to protect against the forgery or substitution of watermarking engines. The use of credentials is described more fully in the Sibert application, previously incorporated by reference herein, and in Menezes et al., *Handbook of Applied Cryptography*, pp. 543-590 (CRC Press 1996) ("Menezes"), which is hereby incorporated by reference. Moreover, in a preferred embodiment authentication in the other direction is provided as well, to prevent unauthorized uses of the watermarking engine such as the forgery of valid fingerprints or the creation of illicit fingerprints. Accordingly, in one embodiment the watermarking engine is operable to establish its own connection to the management and/or application software, and to use that connection to validate the credential of its caller.

For additional security, the data that are passed across the watermarking engine interface (e.g., data passing across the interface for raw content and/or data passing across the interface for marked content) may be encrypted. In one embodiment, a relatively light encryption (e.g., Diffie-Hellmann) with a key negotiated during engine initialization is used. However, in other embodiments, lesser (or greater) levels of protection could be used.

2. Module Validation

In one embodiment the modules that are involved in handling content (e.g., drivers, plug-ins, and/or components) are checked to determine whether they behave in a satisfactory manner. This process generally involves identifying and validating the content-handling modules (e.g., both application driver modules 220a and kernel driver modules 220b), as well as responding to the results of the identification/validation process.

2.1. Identification and Validation

In a preferred embodiment a library of identification and validation information is maintained for use in the identification and validation process. For example, drivers can be identified or validated in a number of ways, including without limitation by their file names; by cryptographic signatures contained in the drivers; by distinctive code patterns and/or behavior patterns contained in, or exhibited by, the drivers; by the size of the driver files; by the memory (and/or hardware) addresses at which the drivers are located; or by any other suitable technique, including a combination of some or all of the aforementioned identification techniques.

In one embodiment the identification and validation process is performed by inspector modules 230 operating in conjunction with inspection manager software 232, as shown in FIG. 2. Inspector modules are operable to check the structure and/or behavior of drivers, software, and/or hardware against predefined criteria and to report the results of these checks to inspection manager software 232. For example, in one embodiment the inspector module is a daemon process that is triggered by the system interrupt (e.g., INT 03) that is generated when drivers are loaded to process content. Thus, the inspector module is able to determine the identity of the drivers that are actually used to process the content, and can then locate the drivers' corresponding registry entries and/or compute the cryptographic hash of the drivers and compare each hash value with a list of known good (or known bad) drivers, or perform other analysis, as described in more detail elsewhere herein.

In a preferred embodiment inspectors 230 and inspection manager 232 are given credentials. The credentials contain attributes specifying the inspector's or manager's identity, which calling software (such as an application) can verify to be sure it matches the intended identity, in order to protect against the forgery or substitution of inspectors 230 and/or inspection managers 232. Moreover, it will be appreciated that while for ease of explanation inspectors 230 and inspection manager software 232 are described as separate entities, in some embodiments inspectors 230 and inspection management software 232 may form part of a single software module. For example, inspectors 230 and inspection management software 232 may comprise an independent software module, or can be included within application software 214 or management software 216. For example, in one embodiment the functionality described above is obtained by integrating a shim API to the system's multimedia management system DLL into the application, the shim API being operable to route calls to the system DLL to the inspection manager software 232, which is operable to evaluate the drivers identified and/or analyzed by inspectors 230 and to take appropriate action before forwarding the original call to the system DLL. In other embodiments, some or all of inspectors 230 and/or inspection management software 232 can be implemented in hardware.

Figure 4A:
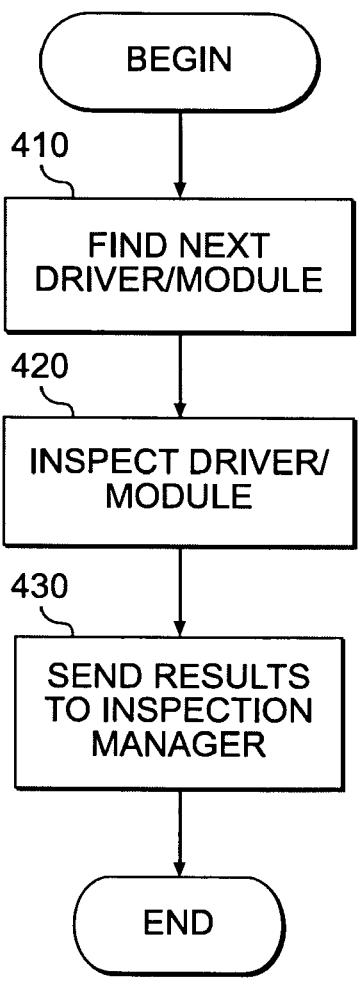
FIGS. 4A and 4B are flow charts illustrating methods of inspecting drivers, software, and/or hardware modules.
Figure 4B:
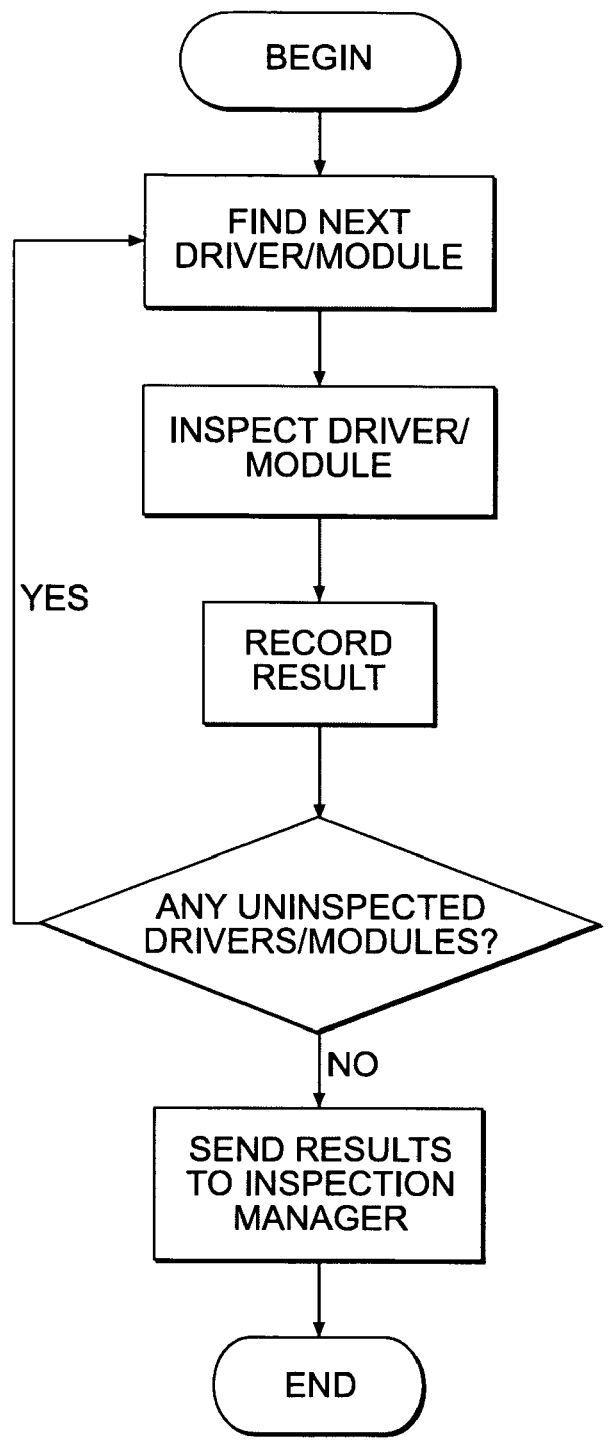

FIGS. 4A and 4B are flow charts illustrating the operation of inspector modules 230 in embodiments of the present invention. Referring to FIG. 4A, in one embodiment each inspector module 230 is operable, upon receipt of an appropriate command from inspection manager software 232, to locate drivers in the appropriate driver chain (410), to inspect those drivers using predefined criteria (such as those set forth above) (420), and to send the results of the inspection to inspection manager 232 (430). As shown in FIG. 4B, in other embodiment inspectors 230 complete inspection of each driver in a driver chain before reporting back to the inspection manager. In other embodiments other reporting protocols may be used.

Figure 5:
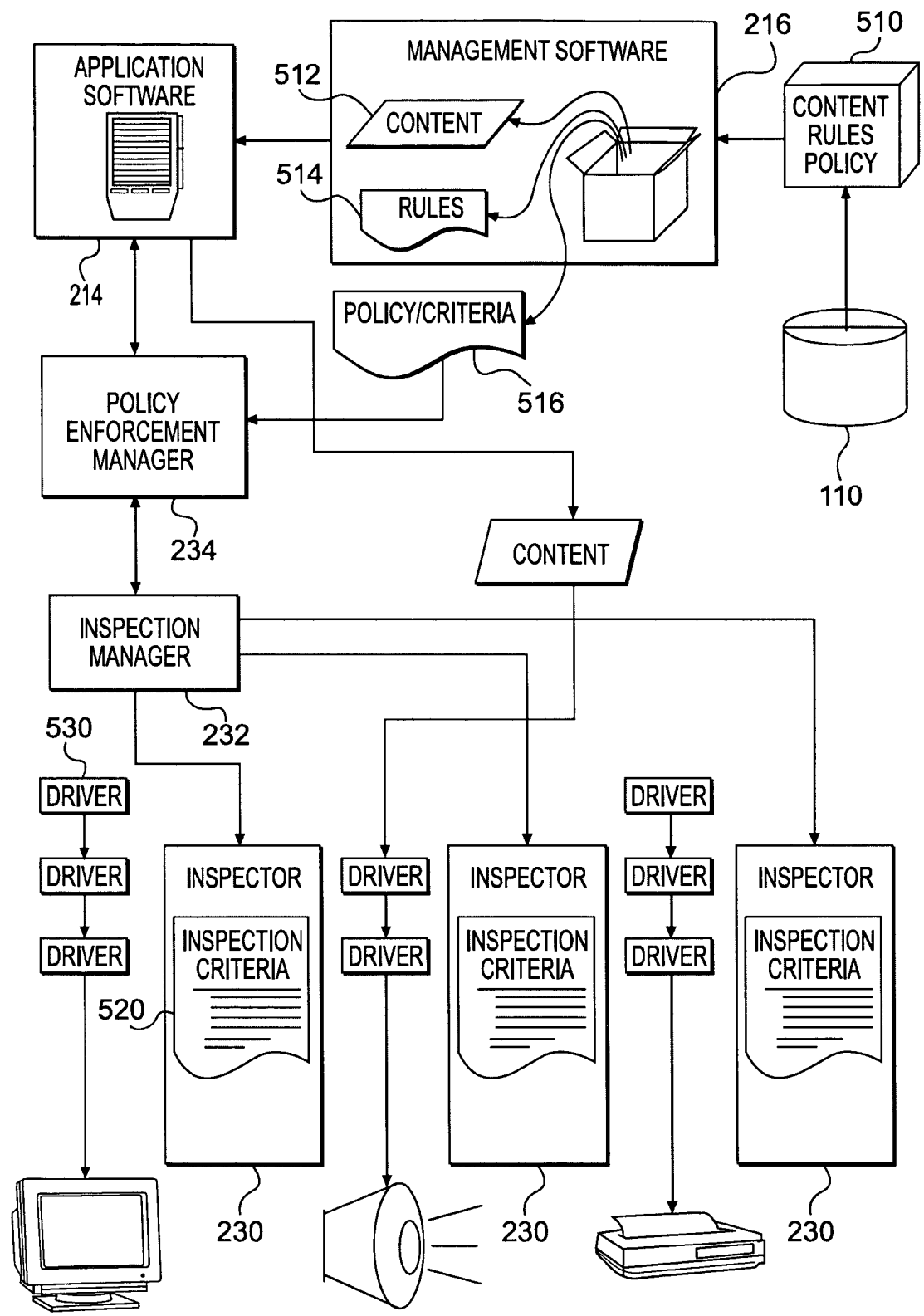
FIG. 5 is a block diagram illustrating a system and method for protecting content by performing inspections of drivers, software, and/or hardware modules, and by using the inspection results in conjunction with predefined policies to control processing and/or use of the content.

As shown in FIG. 5, inspectors 230 may have access to one or more lists of criteria 520 against which to check driver modules 530. For example, lists 520 might include one or more public keys used to verify the cryptographic signatures, if any, contained within driver modules 530. In one embodiment, the integrity of lists 520 is maintained using a combination of cryptographic and obfuscatory techniques, as described, e.g., in the '900 and '422 patents and the Shear and Collberg applications.

Identification information can be stored regarding the drivers residing in the kernel memory space and the user memory space. It will be appreciated that ring zero driver modules are typically fairly easy to identify due to the WINDOWS kernel structures that tie them together in stacks. However, it will also be understood that the kernel structures differ between WINDOWS NT, WINDOWS 95, WINDOWS 98, and WINDOWS 2000. Application plug-in modules, on the other hand, are typically tied together in an application-defined structure.

In a preferred embodiment only those drivers that are involved in the processing of the content are taken into account, since even if unacceptable driver modules are present in the system, they typically do not pose a threat to the content unless they are actually involved in processing it. However, in a preferred embodiment the modules that are being used are dynamically monitored in order to track changes made to these modules during system operation. For example, if it is possible for a module to adjust the stack after the first check is made, the check is made again. In one embodiment inspectors 230 are integrated with the operating system software such that they can detect all registered drivers.

Some modules can be continuously monitored by hooking the functions that load and unload them. This can be done by a monitoring function that starts at boot time and watches continuously. However, boot-time or continuously resident mechanisms may introduce reliability problems, due to the increased chance of failure that is typically characteristic of such mechanisms, and because of the possibility of interference with other continuously resident mechanisms like virus scanners. Thus, in one embodiment the module structures are validated in-place at the time the content is processed.

2.1.1. Validation by Implicit Identification (Signature)

In a preferred embodiment credential/certification techniques described in the Sibert application and the Menezes reference, previously incorporated herein by reference, are used in conjunction with the driver/module validation mechanisms described above to authenticate certified code that has been marked as trusted, thus reducing the complexity of the processing necessary to reliably discriminate between malicious and approved behaviors. This is an important capability, as the general techniques available to malicious programs are virtually unbounded. However, the body of code which can be proven as trustworthy is also virtually unbounded, due to the fact that it may be developed by many different companies, in many different places, and/or may be released in many different versions over the lifetime of any given piece of digital content. It is therefore an advantage of embodiments of the present invention to incorporate the ability to differentiate known, trusted code from non-trusted code, and to be able to incorporate this information in the process of detecting malicious behaviors.

In one embodiment a check can be made for a digital signature on the device or filter module, the signature confirming that the module originated from a trustworthy party. For example, the validation function could implement a rule saying that all drivers signed by a particular party are implicitly acceptable, even though the validation function may not have other specific knowledge about any specific one of these drivers. The MICROSOFT® AUTHENTICODE infrastructure, for example, can be used to support such usage. However, it should be appreciated that any suitable signature or identification technique could be used in accordance with the principles of the present invention, including, e.g., those described in Schneier, *Applied Cryptography*, 2d ed., pp. 483-512 (John Wiley & Sons 1995), which is hereby incorporated by reference. In a preferred embodiment, the validation system contains a list of acceptable signers, which can be updated and/or replaced by a trusted third party, such as the provider of the system's management software. In one embodiment, the list can be automatically updated using techniques described in the '019 and '900 patents and in the Sibert application, previously incorporated by reference herein.

2.1.2. Validation by Explicit Identification

In addition to implicit validation by digital signatures, a cryptographic hash of the module's code can be compared against lists of hash values for "known good" and "known bad" modules. In one embodiment, a trusted party periodically distributes digitally-signed lists of hash values, where each hash has an associated "good" or "bad" attribute. The inspection process hashes the binaries it encounters and looks up the hashes in the list(s), which can be sorted for enhanced efficiency. It should be appreciated that a single list of all "known" modules could be used instead (rather than a sequence of lists). This list could be updated periodically through an automated update mechanism, such as that described above. Moreover, it should be appreciated that any suitable hashing technique could be used, including, e.g., those described in Schneier, *Applied Cryptography*, 2d ed., pp. 429-459 (John Wiley & Sons 1995), which is hereby incorporated by reference.

2.1.3. Validation by Scanning

Identifying known modules by hash values is fine for "good" modules, but a "bad" module could be trivially altered (by its creator) to have a different hash, and thus escape detection by such a scheme. Thus, in a preferred embodiment, more sophisticated scanning techniques are also used. For example, to identify a module (e.g., a kernel and/or application driver or filter) as "probably unacceptable," some or all of the following heuristic approaches can be used:

- For some types of modules (e.g., ring zero drivers), there will typically be a rather limited set of system interfaces that such a module can legitimately invoke. Thus, the presence of imports for other interfaces can serve as an indicator of undesirable behavior. Such a scan can be performed statically on the module's code, dynamically while the module is running, or both. However, such a scan may be defeatable by code that develops function pointers internally, rather than by using imports.
- Alternatively, or in addition, a list of interfaces that are known to be undesirable can be maintained. Although this approach is generally not as robust as a restrictive list, in some applications it may be more acceptable from an end-user standpoint because it will result in fewer false hits. For audio content, for example, known undesirable interfaces include file I/O, network I/O, and various other forms of IPC, such as DDE.
- Yet another approach is to scan for code sequences that are known (or suspected) to represent undesirable behavior—for example, code that attempts to develop function pointers, or strings holding the literal names of undesirable interfaces.
- Another approach is to identify "signature" sequences from "known bad" modules and to scan for them, similar to the manner in which anti-virus programs identify and scan for such sequences in computer viruses. This approach has the advantage that even if changes are made to the "known bad" modules, there will typically be much in common between the old and the new versions, and thus "known bad" modules will have a more difficult time evading detection.
- Yet another approach is to monitor and analyze the dynamic timing operations performed by the module to identify anomalous timing characteristics indicative of invalid and/or malicious activities. For example, a normal request to a hardware peripheral may take a known amount of time. Thus, if the request takes significantly longer to complete, it may indicate that additional (potentially malicious) processing is occurring in the driver chain. Similarly, if the request takes significantly shorter to complete, it may indicate the absence of necessary (potentially protective) processing in the driver chain.

In one embodiment, a scan is performed for patterns of op-code bytes separated by "don't care" bytes, where the "don't care" bytes cover the address and offset portions of instructions. This approach is based on the fact that changes elsewhere in the code are likely to change addresses, but are unlikely to change the basic algorithms. If a handful of locations (e.g., 20) are randomly chosen within the binary, and relatively small signatures (e.g., 50 bytes) are generated for those locations, they can serve to identify a particular program. Even if the program is modified and recompiled, most of the signatures will typically be preserved, thus enabling the system to treat it as a hit, for example, if only 18 of 20 signatures are found (or any other suitable predefined number). Potential signatures can be located by disassembling the binaries with TracePoint to locate the instructions; this has the advantage of allowing signatures to be chosen that are contained in a single function. It is also possible to use statistical techniques to identify opcodes. While such an approach is typically less reliable in terms of signature identification, it is easier to implement and less fragile.

Signatures are preferably sorted or otherwise organized such that a single scan through any particular binary can simultaneously check all signatures. Moreover, the scanning parameters (especially specific sequences), like the hash values, are preferably distributed and updated automatically. In a preferred embodiment, the "known good" list mechanism is combined with a scanning mechanism, thus giving the system a way of accepting modules that for some spurious reason fail the scan, but are actually legitimate.

2.1.4. Policy-Based Validation

In one preferred embodiment the monitoring and detection functions, and the response to identified malicious behaviors, are under the control of an application or associated DRM services policy. Such a policy can be mapped in a relatively straightforward manner to the processing rules associated with the protected digital content itself. (The association of content and rules is described in the '019 and '900 patents, previously incorporated by reference herein).

In a preferred embodiment the detection and monitoring system is invoked at the time that a piece of digital content is selected for processing and its rules have been established. If the rules allow the content to be saved to local storage, the detection and monitoring system need only inspect the processing chain to determine whether there are any attempts in progress at the start of processing, or during ongoing transfer of the content, to direct it through a redirected or substitute module. In a preferred embodiment, additional markings may be added to the content stream in order to allow instrumentation of the general driver stack for the storage medium, or another port capable of streaming the content, in order to determine if the content is being directed through an unapproved streaming channel. Similarly, if the rules associated with the content allow the content to be presented only on screen (e.g. "view"), or to be played only through an audio device (e.g., "play"), then the detection and monitoring system need only set-up processes which instrument the channels appropriate to detecting attacks against those functions (e.g. storing content for later playback, directing it through a substitute module or redirected interface to defeat the protection mechanisms, etc.).

In each of these examples, the protection mechanism is invoked and configured according to the policies of the application, based on rules associated with the digital content. The techniques described can be effectively independent of other protections provided by the operating system on which the application or its associated DRM system is running. This is an important feature, since, in general, there is no objective consistency to the access control semantics or guarantees afforded digital content as it may be used on different operating systems and their native protections. Accordingly, embodiments of the present invention may optionally incorporate additional support from some operating systems, but need not be entirely reliant on protection or access control mechanisms afforded by the operating system, as policies are preferably a function of the rules encoded and associated with the content itself.

In a preferred embodiment, the implementation of the policies specified by the application, content provider, and/or management software is handled by policy enforcement manager 234, as shown in FIG. 2. Policy enforcement manager 234 interacts with inspection manager 232 to obtain the results of the inspectors' analysis of relevant driver, software, and/or hardware modules. Using these results, policy enforcement manager 234 implements the specified policy or policies. In a preferred embodiment, policy enforcement manager, like inspection manager 232 and inspectors 230, is credentialled.

FIG. 5 illustrates the implementation and application of a policy in one embodiment of the present invention. Referring to FIG. 5, management software 216 retrieves digital content from an external source, such as hard disk drive 110 or network 136, via a secure container 510. Secure container 510 may contain digital content file 512, rules 514 governing the use of content 512, and policy criteria 516 governing the security to be applied while using the content in accordance with rules 514. Digital container 510 may, for example, be implemented and used in accordance with the techniques described in the '900 and '019 patents. In a preferred embodiment, secure container 510 comprises a DIGIBOX® container produced by InterTrust Technologies Corporation of Santa Clara, Calif., and management software 216 comprises INTERRIGHTS POINT™ digital rights management software, also produced by InterTrust. In other embodiments, other management software and/or secure container or file mechanisms are used.

Management software 216 is operable to release content file 512 from container 510 to application software 214 in accordance with the rules 514 that govern the content's use. For example, management software 216 may release content 512 to application software 214 upon receipt of a predefined payment from the user. The operation of management software 214 in preferred embodiments of the present invention is described in more detail in the '900 and '019 patents.

Policy criteria 516 may be specified by the content provider, by the application developer, and/or by the developer or controller of the management software. In one embodiment, participants in the value chain are not allowed to circumvent the policies specified by more senior value chain members (see, e.g., the '900 patent for a discussion of value chains). For example, the application developer may be unable (without the content owner's consent) to apply a lesser level of security (e.g., enforce a less restrictive set of policy criteria) than the level of security specified by the content owner. The application developer may, however, be allowed to enforce a stricter set of policy criteria than that specified by the content owner.

Upon releasing content file 512 from container 510, management software 216 also releases policy criteria 516 to policy enforcement manager 234, inspection manager 232, and/or inspectors 230, where these criteria are integrated with the default policies (if any) specified by application software 214 and/or management software 216. Inspectors 230 then use these policy criteria to inspect the appropriate drivers, and to report the results of their inspection to inspection manager 232 and/or policy enforcement manager 234, which evaluate the security of the system by applying the policy to the inspection data. If the results of this analysis indicate that defensive action is warranted, an appropriate signal is sent to application 214 and/or management software 216.

Figure 6:
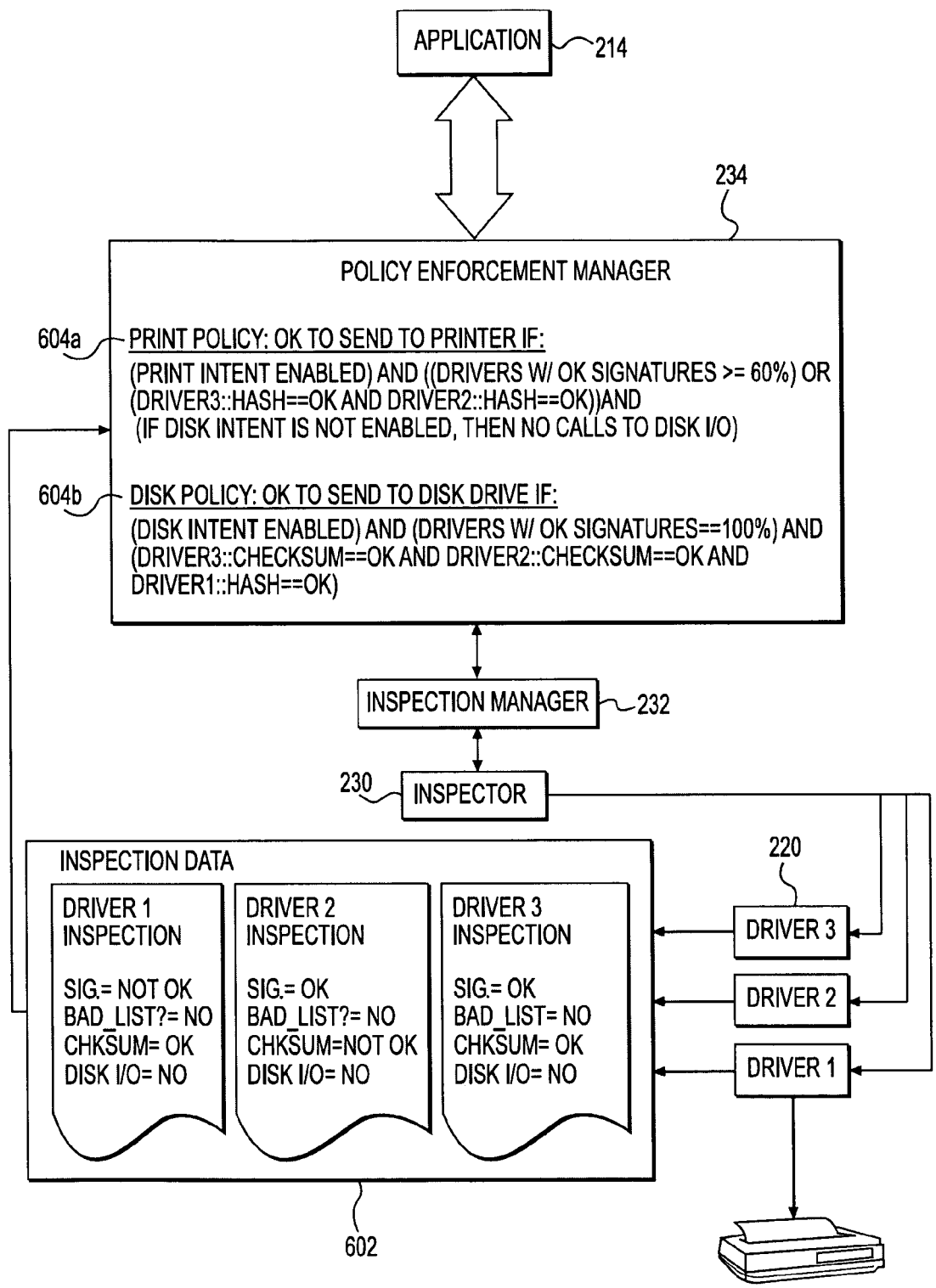
FIG. 6 is an illustration of the application of a policy for processing content in light of system characteristics.

FIG. 6 provides an example of the application of a policy to the data obtained by inspectors 230. As shown in FIG. 6, policy enforcement manager 234 may contain a variety of different policies 604 associated with a given piece of electronic content. For purposes of illustration, FIG. 6 shows two such policies 604, one governing the release of a content file to a printer, the other governing the release of the content file to a disk drive. As shown in FIG. 6, the policies may comprise logical expressions containing a variety of conditions. For example, print policy 604a indicates that the content file can be sent to the printer as long as (a) the rules (e.g., rules 514 in FIG. 5) associated with the content indicate that it is ok to print the content (i.e., if the print intent is enabled); and (b) the drivers responsible for handling the content on its way to the printer satisfy certain conditions (e.g., a certain percentage have valid signatures, certain drivers' hash values are found on the list of known "good" drivers, etc.). Inspectors 230 gather the data 602 needed by policy enforcement manager 234 to evaluate the logical policy expressions 604. For example, inspectors 230 might check the cryptographic signatures (if any) associated with the drivers in the appropriate driver chain, compute the hash of a driver and compare it to lists of known "good" and/or known "bad" drivers, compute the checksum of all or part of a driver, check for calls to certain interfaces such as disk I/O, and/or perform a variety of other data gathering and analysis operations. Upon receiving inspection data 602, policy enforcement manager 234 is operable to determine whether the appropriate policy criteria 604 have been satisfied, and permit the release of the content and/or take appropriate defensive action accordingly.

In one embodiment, driver modules are classified within one of three general categories: modules that are unambiguously acceptable, modules that are unambiguously unacceptable; and modules that are probably unacceptable (or acceptable). However, it will be appreciated that a virtually limitless number of policies could be implemented in accordance with the principles of the present invention.

In a preferred embodiment, the techniques described in the '900 and '019 patents for independently delivering rules and controls are applied to enable policy criteria to be independently updated. For example, if it became known that the security of the drivers manufactured by a particular party had been compromised, the content owner, application developer, and/or rights management software operator could modify the policies associated with susceptible content to indicate that the content should not be used in conjunction with drivers containing the compromised party's signature. When a secure driver was developed to replace the compromised one, the policies associated with the susceptible content could be modified once again to allow usage of the new driver. Thus, the security of the system can be flexibly and seamlessly controlled without the need for entire content files to be retransmitted, or application programs rewritten and re-released, whenever changes in policy are desired.

While management software 216, application software 214, policy enforcement software 234, inspection manager 232, and inspectors 230 are, for ease of explanation, shown in FIG. 5 as separate modules, it should be appreciated that this need not be the case. For example, one of ordinary skill in the art will appreciate that some or all of these modules can be combined with each other without departing from the principles of the present invention.

2.1.5. Interlocking Identification and/or Validation

In one embodiment the content protection mechanisms described above can be linked with, and can be tested for, authenticity by the application and/or its associated DRM system. For example, the code that implements the protection mechanism can be authenticated using techniques such as those described in the Sibert application, the '900 patent, or the Menezes reference. In such an embodiment the application program or DRM system is thus able to determine whether the protection mechanism can be trusted. In one embodiment the application and/or its associated DRM system is linked with the protection mechanism using standard linker/loader techniques, and is instrumented by the application or DRM programmer to ensure that the protection mechanism is loaded and running. An application so instrumented can also be certified by a business process associated with the use of the protection mechanism, such that a certified application will not run if the protection mechanism is disabled. Different program modules running in user mode and/or kernel mode operating system memory can be similarly instrumented to perform ongoing checks for the presence of authentic and credentialed code. If any part of the protection mechanism is disabled, all instrumented code can be made to discontinue processing.

2.2. Response

When an unacceptable module is detected during processing of protected content, the system is operable to respond in an appropriate manner. For example, in one embodiment three response options are provided: (1) return an error and deny the operation; (2) remove or disable the offending module and deny the operation; and (3) damage the content, but permit the operation to continue.

For example, upon detecting an unacceptable driver module, the system can inform the user that the content is not accessible because the offending driver is present in the user's configuration. A more sophisticated response is to remove or disable the unacceptable module. This is particularly plausible for drivers, where there are well-defined interfaces for doing so; however, will generally be undesirable to have a tamper-resistance mechanism change the configuration of drivers in the system, as pushing and popping drivers dynamically might interfere with other legitimate uses of those drivers, and might also carry a non-negligible risk of crashes.

Another form of response involves damaging the content, but still allowing it to be processed. From a countermeasures standpoint, this will typically be better than simply preventing access to the content, as it will generally be more difficult for a hacker to recognize and undo damage, or to prevent it from happening, than it is to identify a decision point that prevents the access entirely. Damage can involve any suitable mechanism, including those as simple as randomly changing bits in the stream without an understanding of the content semantics, or can be more sophisticated, involving, e.g., the removal of high-frequency components from audio data.

3. Content Transfer Protection

Embodiments of the present invention may also incorporate a novel content transfer protection mechanism. The content transfer protection mechanism works by generating content "signatures" or identifiers for protected content, then filtering file system interfaces (and/or other communication interfaces, including without limitation network and inter-process communication interfaces) to prevent the writing of data containing those signatures or identifiers. In this context, a content signature is preferably a distillation (similar to a secure hash) of some part of a protected content object. In a preferred embodiment the signature is derived from the content, as opposed to being inserted into the content like a watermark. For example, the MD4 hash algorithm could be used to generate an identifier consisting of the hash of some or all of the content object. As yet another example, the identifier might simply consist of a predefined portion of the content object (e.g., a segment of 512 bytes). In other embodiments, other identification schemes can be used. The content signature mechanism may be optimized for rapid scanning to locate signatures within large sequences of data.

Figure 7A:
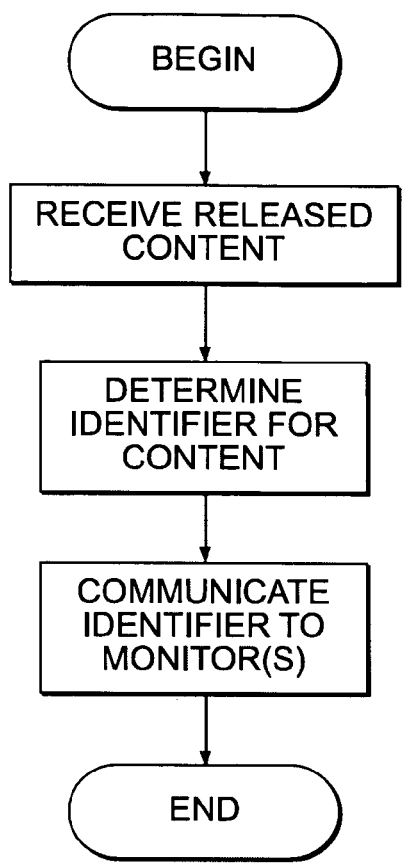
FIGS. 7A and 7B are flow charts illustrating the operation of a content transfer manager and a content transfer monitor in accordance with an embodiment of the present invention.
Figure 7B:
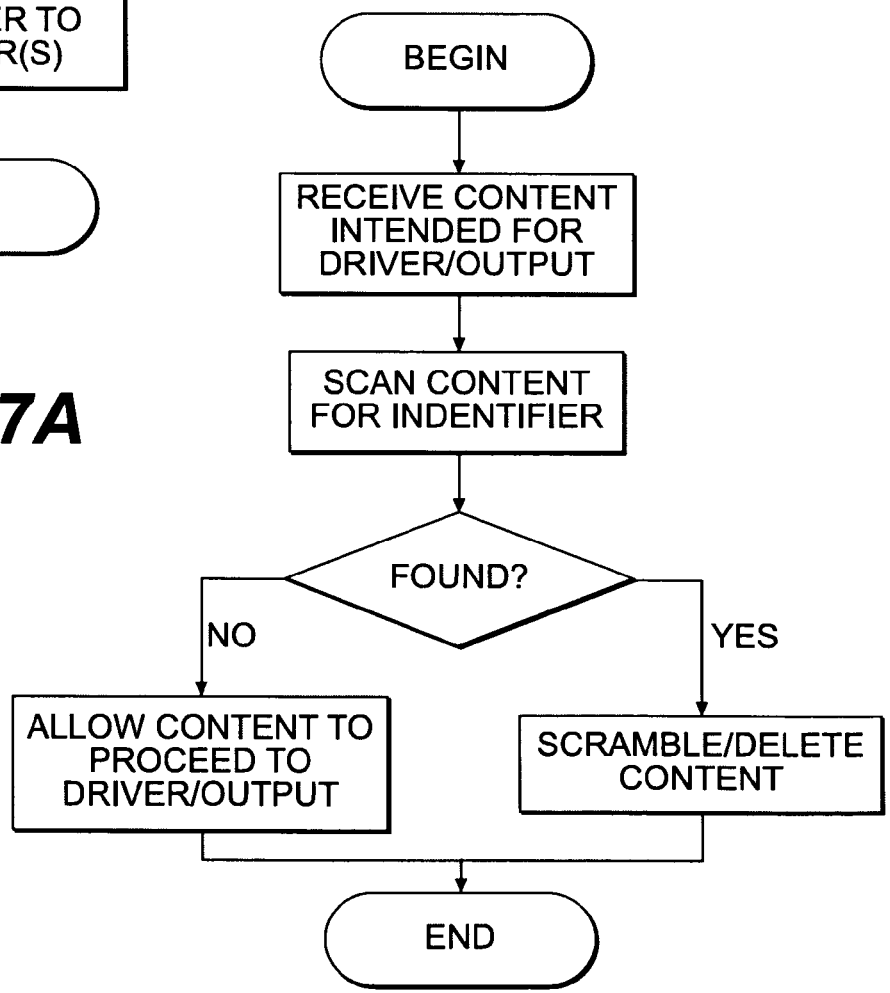
Figure 8:
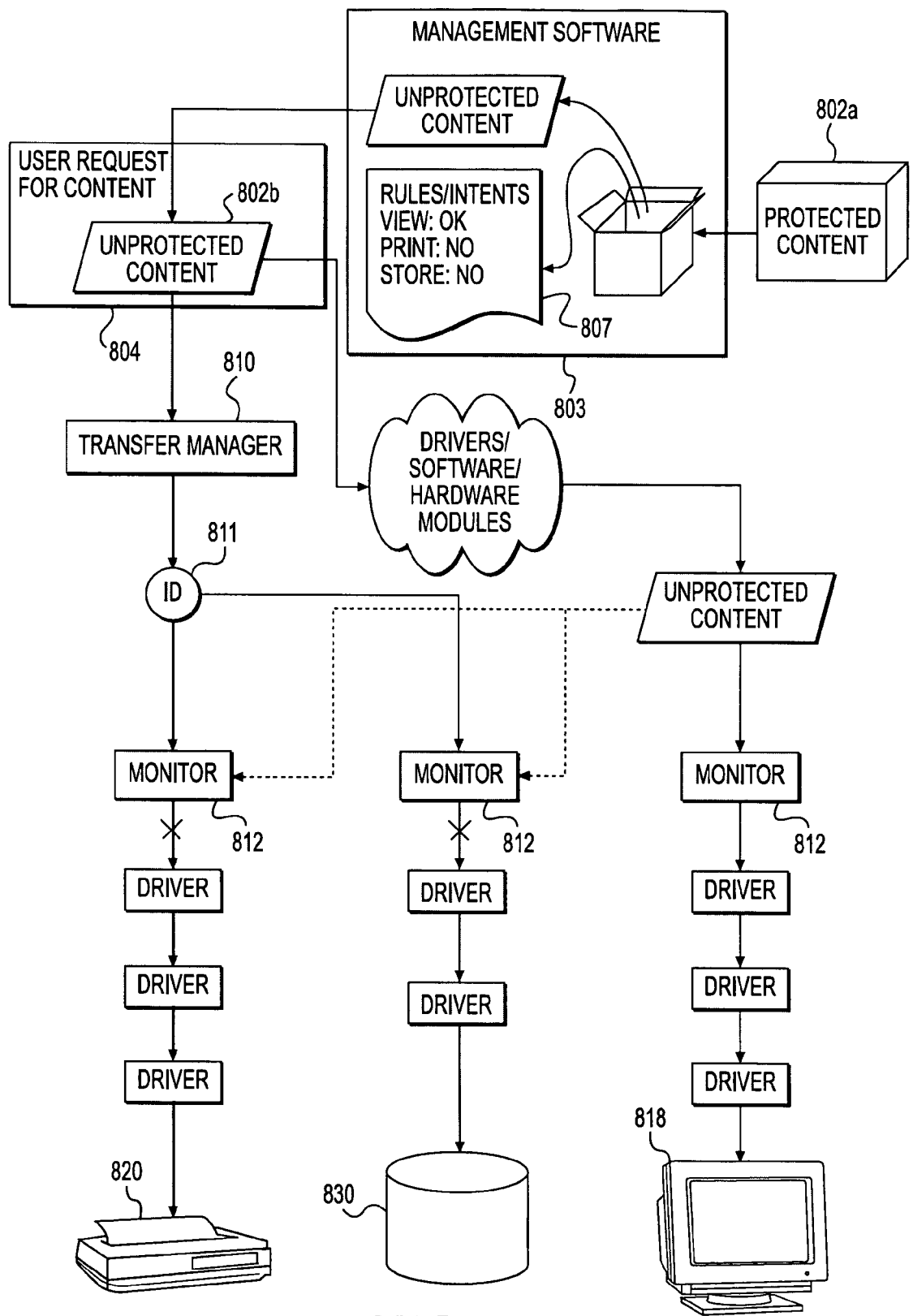
FIG. 8 illustrates a content transfer protection mechanism in accordance with an embodiment of the present invention.

FIGS. 7A, 7B, and 8 illustrate a content transfer protection mechanism in accordance with an embodiment of the present invention. As shown in FIGS. 7A and 8, when content 802 is released by the management software 803 to an application 804, transfer manager 810 (which may, in some embodiments be integrated with the application and/or management software library) derives one or more signatures 811 from the content (blocks 710-712 in FIG. 7A). In one embodiment, the signature of the first 512 bytes of content is taken, as are the signatures of predefined selections of subsequent 512-byte blocks. As transfer manager 810 generates each signature 811, it informs the transfer protection monitors 812 of the signature's value (block 714 of FIG. 7A). In one embodiment, monitors 812 maintain a list of such signatures.

Referring to FIGS. 7B and 8, transfer protection monitors 812, which may operate as kernel drivers within the operating system, intercept data being written through file (or other) system interfaces and scan these data for signatures 811 in the specified list of values (blocks 750-752 in FIG. 7B). If a matching region of data is found (i.e., a "yes" exit from block 754), and it is being written to an invalid destination, corrective action can be taken (756). For example, content file 802 in FIG. 8 is only allowed to be viewed on monitor 818 (as specified by rules 807 associated with content file 802). Thus, if content file 802 is sent to printer 820 or to disk storage 830, monitors 812 will detect it and take defensive action (denoted in FIG. 8 by Xs blocking the driver paths). The defensive action may simply be to make the operation fail, or it may instead be to damage the data so that the resulting file is not obviously broken, but has internal damage that effectively eliminates its commercial value (e.g., the content could be scrambled).

One of ordinary skill in the art will recognize that the systems and methods presented herein are readily applicable to a wide variety of content types and applications. For example, the systems and methods of the present invention can be used to enhance the security of printing or viewing content files. Although printer drivers can legitimately include file I/O calls, and thus should generally not be scanned to avoid them, scanning can be used to prevent the use of certain unacceptable print drivers. Moreover, while print jobs are often written to print queue files which cannot be readily protected, locally-accessible print queues can be created to address this problem. In addition, certain print spool entries can be intercepted and encrypted/decrypted as appropriate. Yet another protection that can be applied is to disable, at the driver interface level, the ability to print to a file and/or to request multiple copies of a printout.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method for protecting electronic media content from unauthorized use by a user of a computer system, the method including:
   receiving a request from a user of the computer system to use a piece of electronic media content;
   identifying one or more software modules responsible for processing the piece of electronic media content and enabling use of the piece of electronic media content by the user;
   processing at least a portion of said piece of electronic media content using at least one of the one or more software modules;
   evaluating whether the at least one of the one or more software modules process the portion of the electronic media content in an authorized manner, the evaluating including at least one action selected from the group consisting of:
      evaluating whether the at least one of the one or more software modules make calls to certain system interfaces;
      evaluating whether the at least one of the one or more software modules direct data to certain channels;
      analyzing dynamic timing characteristics of the at least one of the one or more software modules for anomalous timing characteristics indicative of invalid or malicious activity;
   denying the request to use the piece of electronic media content if the evaluation indicates that the at least one of the one or more software modules fail to satisfy a set of predefined criteria.

2. A method as in claim 1, further including:
   using the predefined criteria to evaluate the at least one of the one or more software modules according to a predefined policy, and basing a decision to deny the request on the outcome of this evaluation.

3. A method as in claim 1, further comprising computing a cryptographic hash of at least one of the one or more software modules.

4. A system for protecting electronic media content and enabling use of the electronic media content by a user, the system comprising:
   means for evaluating one or more predefined characteristics of one or more drivers responsible for handling the electronic media content, the means for evaluating including means for operating a protection mechanism selected from the group consisting of:
      means for evaluating whether the one or more drivers make calls to certain system interfaces;
      means for determining whether the one or more drivers include one or more predefined code sequences associated with undesirable behavior;
      means for analyzing dynamic timing characteristics of the one or more drivers for anomalous timing characteristics indicative of invalid or malicious activity;
      means for determining whether the one or more drivers are included on a list of trusted drivers;
      means for determining whether the one or more drivers are included on a list of untrusted drivers; and
      means for determining whether the one or more drivers have been digitally signed by a trusted party;
   means for denying effective access to the electronic media content based on an output of said means for evaluating one or more predefined characteristics of the drivers responsible for handling the electronic media content;
   means for generating an identifier associated with the electronic media content;
   means for monitoring a predefined system interface for data to be transferred to an output device to determine if the data to be transferred to an output device contains the identifier; and
   means for preventing effective access to data containing the identifier via the predefined system interface.

5. A method for protecting electronic media content from unauthorized use, the method including:
   receiving a request to access a piece of electronic media content;
   generating a first identifier associated with the piece of electronic media content; and
   monitoring at least one system interface for electronic data to be transferred to an output device, the monitoring including:
      receiving at least a portion of the electronic data to be transferred to the output device;
      generating a second identifier associated with the at least a portion of the electronic data;
      comparing the second identifier with the first identifier; and
      taking a predefined defensive action if the second identifier is related to the first identifier in a predefined manner, wherein the predefined defensive action is selected from the group consisting of:
- modifying at least a portion of the piece of electronic data, and
- preventing the transfer of at least a portion of the piece of electronic data to the output device via the system interface.

6. A method as in claim 5, wherein the piece of electronic media content is encrypted, the method further including:
decrypting the piece of electronic media content.

7. A method as in claim 5, in which the first identifier comprises a hash of at least a portion of the piece of electronic media content, and in which the second identifier comprises a hash of at least the portion of the electronic data to be transferred to the output device.

8. A method as in claim 5, in which the first identifier comprises a predefined portion of the piece of electronic media content.

9. A method as in claim 5, in which the system interface comprises a file system interface to one or more device drivers.

10. A method as in claim 9, in which the one or more device drivers are selected from the group consisting of: video display driver, sound driver, SCSI driver, IDE driver, network driver, video capture driver, floppy disk driver, and scanner driver.

11. A method as in claim 5, in which the predefined defensive action comprises modifying at least a portion of the electronic data to be transferred to the output device.

12. A method as in claim 11, in which modifying at least a portion of the electronic data to be transferred to the output device includes scrambling at least a portion of the electronic data.

13. A method as in claim 5, in which the predefined defensive action comprises adding noise to at least a portion of the electronic data to be transferred to the output device.

14. A method as in claim 5, in which the predefined defensive action comprises adding an electronic watermark or fingerprint to at least a portion of the electronic data to be transferred to the output device.

15. A method as in claim 5, in which the predefined defensive action comprises preventing the transfer of at least a portion of the electronic data to an output device via the system interface.

16. A method as in claim 5, in which the predefined relation between the first identifier and the second identifier comprises the first identifier being equal to the second identifier.

17. A method as in claim 5, in which the at least one system interface is selected using rules associated with the piece of electronic media content, the rules being operable to identify certain system interfaces to which the piece of electronic media content is not allowed to be sent.

18. A method as in claim 5, further including:
inserting a cryptographic fingerprint into the piece of electronic media content, the cryptographic fingerprint containing information relating to the request to access said piece of electronic media content.

19. A method as in claim 18, in which inserting said cryptographic fingerprint into the piece of electronic media content includes:
- authenticating a fingerprinting engine using a cryptographic credential; and
- using the fingerprinting engine to insert the cryptographic fingerprint into the piece of electronic media content.

20. A method as in claim 19, in which the fingerprinting engine is operable to authenticate a calling application using a cryptographic credential.

* * * * *